(12) United States Patent
Beale et al.

(10) Patent No.: US 12,335,950 B2
(45) Date of Patent: Jun. 17, 2025

(54) COMMUNICATIONS DEVICES AND METHODS

(71) Applicant: Sony Group Corporation, Tokyo (JP)

(72) Inventors: Martin Warwick Beale, Basingstoke (GB); Kazuyuki Shimezawa, Basingstoke (GB)

(73) Assignee: SONY GROUP CORPORATION, Tokyo (JP)

( * ) Notice: Subject to any disclaimer, the term of this patent is extended or adjusted under 35 U.S.C. 154(b) by 414 days.

(21) Appl. No.: 17/794,983

(22) PCT Filed: Feb. 11, 2021

(86) PCT No.: PCT/EP2021/053343
§ 371 (c)(1),
(2) Date: Jul. 25, 2022

(87) PCT Pub. No.: WO2021/165140
PCT Pub. Date: Aug. 26, 2021

(65) Prior Publication Data
US 2023/0100797 A1    Mar. 30, 2023

(30) Foreign Application Priority Data
Feb. 17, 2020    (EP) ..................................... 20157803

(51) Int. Cl.
*H04W 72/20*    (2023.01)
*H04W 72/0446*    (2023.01)
*H04W 72/0453*    (2023.01)

(52) U.S. Cl.
CPC ....... *H04W 72/20* (2023.01); *H04W 72/0446* (2013.01); *H04W 72/0453* (2013.01)

(58) Field of Classification Search
None
See application file for complete search history.

(56) References Cited

U.S. PATENT DOCUMENTS

| | | | |
|---|---|---|---|
| 11,057,870 B2 * | 7/2021 | Huang | H04L 1/1887 |
| 11,425,690 B2 * | 8/2022 | Manolakos | H04W 72/046 |
| 12,069,616 B2 * | 8/2024 | Zhao | H04L 1/1812 |

FOREIGN PATENT DOCUMENTS

WO    2018/084796 A1    5/2018

OTHER PUBLICATIONS

International Search Report and Written Opinion mailed on May 6, 2021, received for PCT Application PCT/EP2021/053343, filed on Feb. 11, 2021, 12 pages.

(Continued)

*Primary Examiner* — Hong S Cho
(74) *Attorney, Agent, or Firm* — XSENSUS LLP

(57) ABSTRACT

A communications device including a receiver configured to receive signals from one or more of a plurality of other communications devices within sidelink communications resources of a plurality of instances of a resource pool of a sidelink interface, the resource pool being formed of a plurality of time-divided slots and a plurality of frequency-divided regions, and a controller. The controller is configured in combination with the receiver to monitor for one or more first current signals transmitted by at least a first transmitting communications device in a first subset of the time-divided slots and the frequency-divided regions of the resource pool during a first of the resource pool instances.

20 Claims, 20 Drawing Sheets

(56) References Cited

OTHER PUBLICATIONS

3GPP, "Evolved Universal Terrestrial Radio Access (E-UTRA) and Evolved Universal Terrestrial Radio Access Network (E-UTRAN); Overall description; Stage 2 (Release 15)", 3GPP TS 36.300 V15.7.0, Sep. 2019, pp. 1-365.
Holma et al., "LTE for UMTS OFDMA and SC-FDMA Based Radio Access", John Wiley & Sons, 2009, 232 pages.
NTT Docomo Inc., "Revised WID on New Radio Access Technology", 3GPP TSG RAN Meeting #78, RP-172834, Dec. 18-21, 2017, 11 pages.
3GPP, "NR; Study on UE Power Saving (Release 16)", 3GPP TR 38.840 V0.1.0, Nov. 2018, pp. 1-24.
3GPP, "Evolved Universal Terrestrial Radio Access (E-UTRA) and Evolved Universal Terrestrial Radio Access Network (E-UTRAN); Overall description; Stage 2 (Release 16)", 3GPP TS 36.300 V16.0.0, Dec. 2019, pp. 1-366.
3GPP, "NR; Medium Access Control (MAC) protocol specification (Release 15)", 3GPP TS 38.321 V15.4.0, Dec. 2018, pp. 1-77.
ZTE, "Discussion on relay discovery of bandwidth limited remote UE", Discussion on relay discovery of bandwidth limited remote UE, R2-1708513, Aug. 21-25, 2017, 5 pages.
Sony: "Discussion on sidelink resource allocation and configuration", 3GPP TSG RAN WG1 Meeting #89, R1-1708264, May 15-19, 2017, 6 pages.
Intel Corporation et al: "Discontinuous reception over SL", 3GPP TSG RAN WG2#97bis, R2-1703502, Apr. 3-7, 2017, 2 pages.

* cited by examiner

COMMUNICATIONS DEVICES AND METHODS

CROSS-REFERENCE TO RELATED APPLICATIONS

The present application is based on PCT filing PCT/EP2021/053343, filed Feb. 11, 2021, which claims priority to EP 20157803.6, filed Feb. 17, 2020, the entire contents of each are incorporated herein by reference.

BACKGROUND

Field of Disclosure

The present disclosure relates generally to communications devices and methods of operating communications devices and specifically to communications devices configured to communicate with other communications device via device-to-device (D2D) communications via a sidelink interface.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will be expected to routinely and efficiently support communications with a wider range of devices associated with a wider range of data traffic profiles and types than current systems are optimised to support. For example it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance.

In view of this there is expected to be a desire for future wireless communications networks, for example those which may be referred to as 5G or new radio (NR) system/new radio access technology (RAT) systems, as well as future iterations/releases of existing systems, to efficiently support connectivity for a wide range of devices associated with different applications and different characteristic data traffic profiles.

One aspect of both LTE and NR is direct device-to-device (D2D) communications between two communications devices, wherein some of the signals are not transmitted to or from a base station. Such D2D communications are also referred to as sidelink communications, and signals are transmitted directly between communications devices over a sidelink interface.

The increasing use of different types of network infrastructure equipment and terminal devices associated with different traffic profiles give rise to new challenges for efficiently handling communications in wireless communications systems that need to be addressed.

SUMMARY OF THE DISCLOSURE

The present disclosure can help address or mitigate at least some of the issues discussed above.

Some embodiments of the present technique can provide a communications device. The communications device (which is a receiving communications device) comprises a receiver configured to receive signals from one or more of a plurality of other communications devices within sidelink communications resources of a plurality of instances of a resource pool of a sidelink interface, the resource pool being formed of a plurality of time-divided slots and a plurality of frequency-divided regions, and a controller. The controller is configured in combination with the receiver to monitor for one or more first current signals transmitted by at least a first transmitting communications device of the other communications devices to the receiving communications device in a first subset of the time-divided slots and the frequency-divided regions of the resource pool during a first of the resource pool instances, wherein the first subset is dependent on which of the time-divided slots and the frequency-divided regions of the resource pool in which one or more first previous signals were received by the receiving communications device from the first transmitting communications device during a second of the resource pool instances during which the receiving communications device is configured to monitor a larger number of the time-divided slots of the resource pool than in the first subset and/or a larger number of the frequency-divided regions of the resource pool than in the first subset, wherein the second resource pool instance is a preceding resource pool instance to the first resource pool instance.

Other embodiments of the present technique can also provide a communications device. The communications device (which is a receiving communications device) comprises a receiver configured to receive signals from one or more of a plurality of other communications devices within sidelink communications resources of a plurality of instances of a resource pool of a sidelink interface, the resource pool being formed of a plurality of time-divided slots and a plurality of frequency-divided regions, and a controller. The controller is configured in combination with the receiver to monitor for signals transmitted by one or more transmitting communications devices of the other communications devices to the receiving communications device in a subset of the time-divided slots and the frequency-divided regions of the resource pool during a first of the resource pool instances, to receive one or more signals in the subset during the first resource pool instance, and to monitor for signals in a larger number of the time-divided slots of the resource pool than in the subset and/or a larger number of the frequency-divided regions of the resource pool than in the subset during a second of the resource pool instances in response to receiving the one or more signals in the subset during the first resource pool instance.

Embodiments of the present technique, which further relate to transmitting communications devices, methods of operating receiving and transmitting communications devices and circuitry for receiving and transmitting communications devices, allow for the reduction of battery power consumption for sidelink/D2D communications.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Long Term Evolution Advanced Radio Access Technology (4G)

Figure 1:
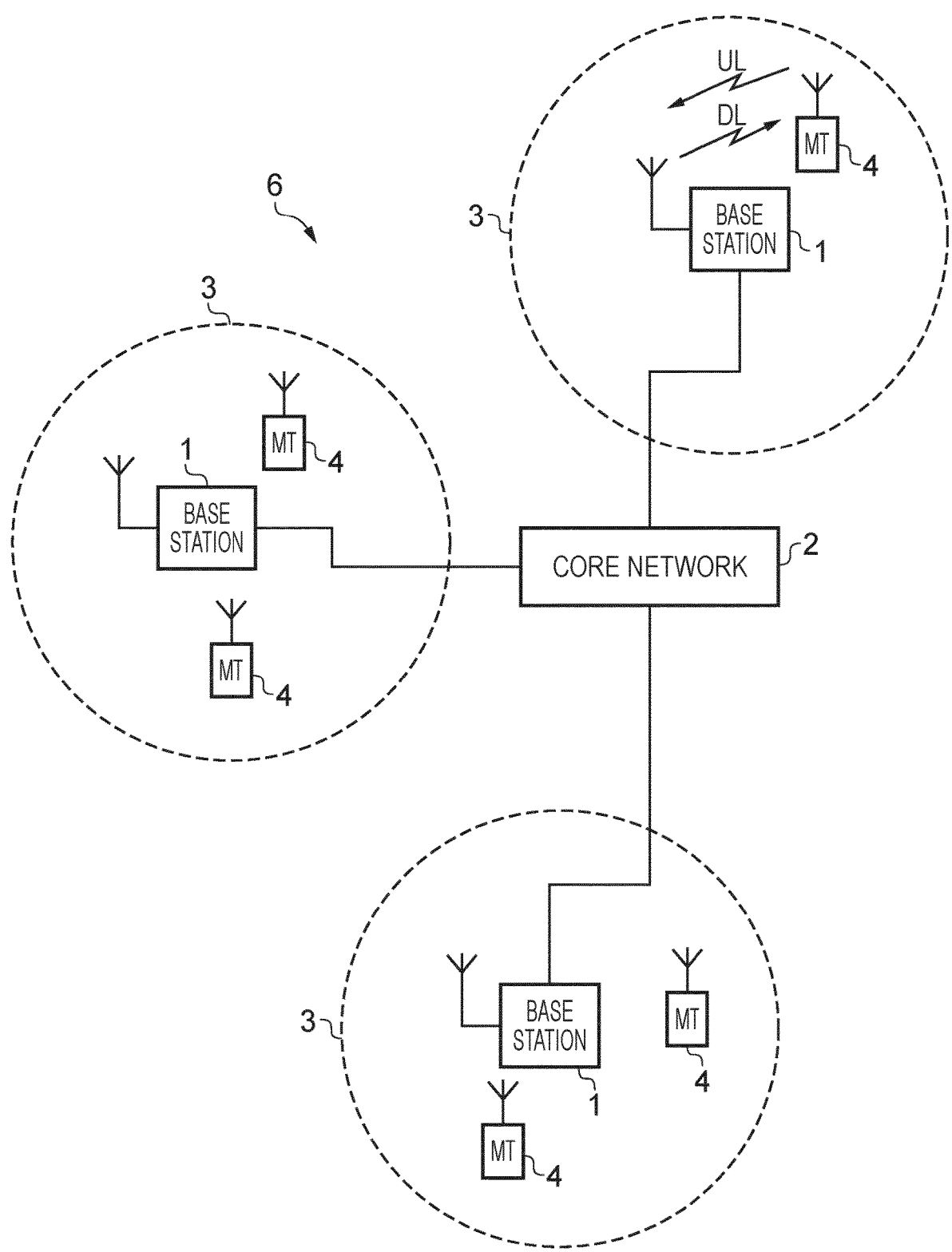
FIG. 1 schematically represents some aspects of an LTE-type wireless telecommunication system which may be configured to operate in accordance with certain embodiments of the present disclosure.

FIG. 1 provides a schematic diagram illustrating some basic functionality of a mobile telecommunications network/system 10 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP® body, and also described in many books on the subject, for example, Holma H. and Toskala A [1]. It will be appreciated that operational aspects of the telecommunications (or simply, communications) networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 6 includes a plurality of base stations 1 connected to a core network 2. Each base station provides a coverage area 3 (i.e. a cell) within which data can be communicated to and from terminal devices 4. Data is transmitted from base stations 1 to terminal devices 4 within their respective coverage areas 3 via a radio downlink (DL). Data is transmitted from terminal devices 4 to the base stations 1 via a radio uplink (UL). The core network 2 routes data to and from the terminal devices 4 via the respective base stations 1 and provides functions such as authentication, mobility management, charging and so on. Terminal devices may also be referred to as mobile stations, user equipment (UE), user terminal, mobile radio, communications device, and so forth. Base stations, which are an example of network infrastructure equipment/network access node, may also be referred to as transceiver stations/nodeBs/e-nodeBs/eNBs/g-nodeBs/gNBs and so forth. In this regard different terminology is often associated with different generations of wireless telecommunications systems for elements providing broadly comparable functionality. However, certain embodiments of the disclosure may be equally implemented in different generations of wireless telecommunications systems, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G)

As mentioned above, the embodiments of the present disclosure can also find application with advanced wireless communications systems such as those referred to as 5G or New Radio (NR) Access Technology. The use cases that are considered for NR include:

Enhanced Mobile Broadband (eMBB)
Massive Machine Type Communications (mMTC)
Ultra Reliable & Low Latency Communications (URLLC) [2]

eMBB services are characterised by high capacity with a requirement to support up to 20 Gb/s. The requirement for URLLC is a reliability of $1-10^{-5}$ (99.999%) for one transmission of a relatively short packet such as 32 bytes with a user plane latency of 1 ms.

The elements of the wireless access network shown in FIG. 1 may be equally applied to a 5G new RAT configuration, except that a change in terminology may be applied as mentioned above.

Figure 2:
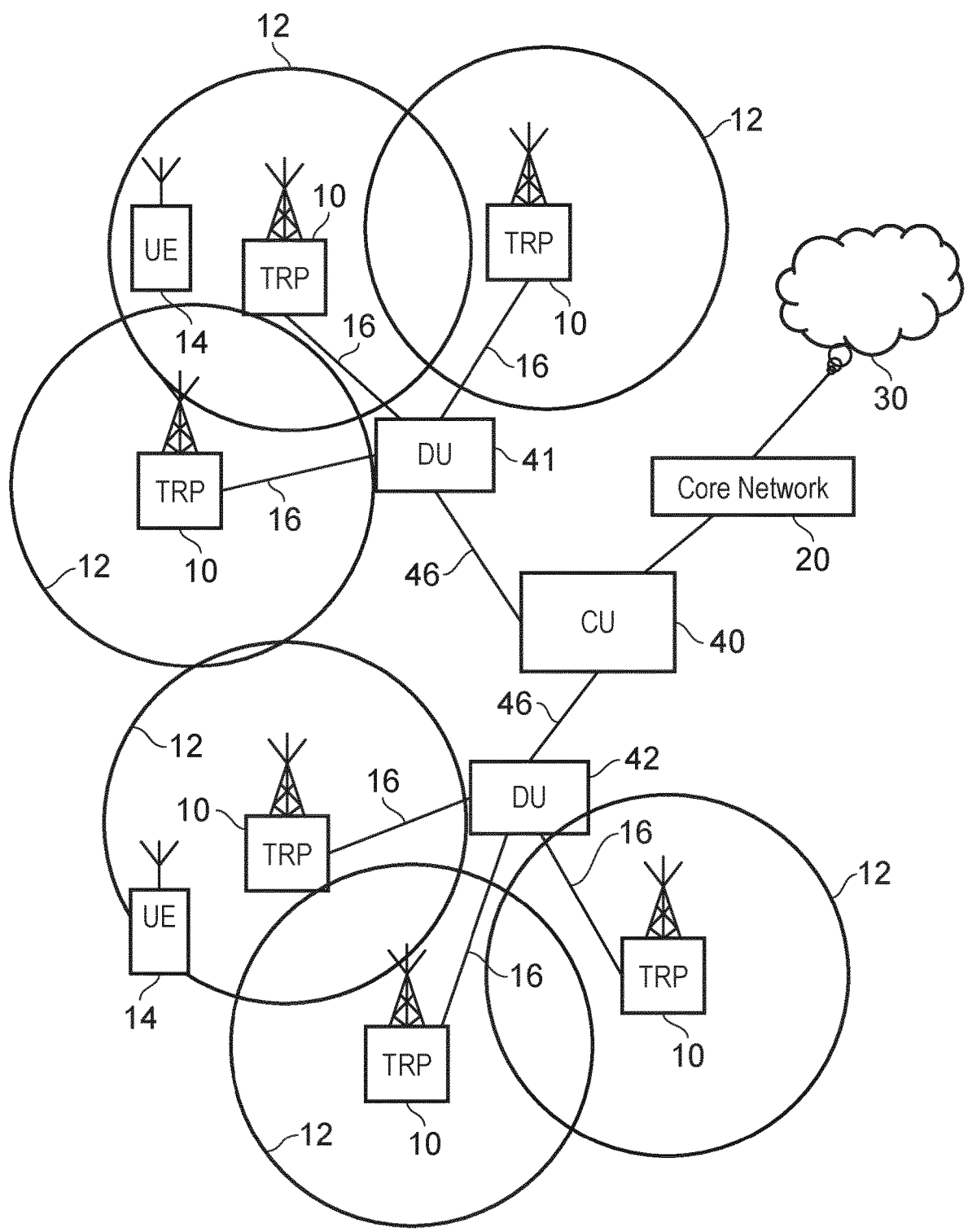
FIG. 2 schematically represents some aspects of a new radio access technology (RAT) wireless telecommunications system which may be configured to operate in accordance with certain embodiments of the present disclosure.

An example configuration of a wireless communications network which uses some of the terminology proposed for and used in NR and 5G is shown in FIG. 2. In FIG. 2 a plurality of transmission and reception points (TRPs) 10 are connected to distributed control units (DUs) 41, 42 by a connection interface represented as a line 16. Each of the TRPs 10 is arranged to transmit and receive signals via a wireless access interface within a radio frequency bandwidth available to the wireless communications network. Thus, within a range for performing radio communications via the wireless access interface, each of the TRPs 10, forms a cell of the wireless communications network as represented by a circle 12. As such, wireless communications devices 14 which are within a radio communications range provided by the cells 12 can transmit and receive signals to and from the TRPs 10 via the wireless access interface. Each of the distributed units 41, 42 are connected to a central unit (CU) 40 (which may be referred to as a controlling node) via an interface 46. The central unit 40 is then connected to the core network 20 which may contain all other functions required to transmit data for communicating to and from the wireless communications devices and the core network 20 may be connected to other networks 30.

The elements of the wireless access network shown in FIG. 2 may operate in a similar way to corresponding elements of an LTE network as described with regard to the example of FIG. 1. It will be appreciated that operational aspects of the telecommunications network represented in FIG. 2, and of other networks discussed herein in accordance with embodiments of the disclosure, which are not specifically described (for example in relation to specific communication protocols and physical channels for communicating between different elements) may be implemented in accordance with any known techniques, for example according to currently used approaches for implementing such operational aspects of wireless telecommunications systems, e.g. in accordance with the relevant standards.

The TRPs 10 of FIG. 2 may in part have a corresponding functionality to a base station or eNodeB of an LTE network. Similarly, the communications devices 14 may have a functionality corresponding to the UE devices 4 known for operation with an LTE network. It will be appreciated therefore that operational aspects of a new RAT network (for example in relation to specific communication protocols and physical channels for communicating between different elements) may be different to those known from LTE or other known mobile telecommunications standards. However, it will also be appreciated that each of the core network component, base stations and communications devices of a new RAT network will be functionally similar to, respectively, the core network component, base stations and communications devices of an LTE wireless communications network.

In terms of broad top-level functionality, the core network 20 connected to the new RAT telecommunications system represented in FIG. 2 may be broadly considered to correspond with the core network 2 represented in FIG. 1, and the respective central units 40 and their associated distributed units/TRPs 10 may be broadly considered to provide functionality corresponding to the base stations 1 of FIG. 1. The term network infrastructure equipment/access node may be used to encompass these elements and more conventional base station type elements of wireless telecommunications systems. Depending on the application at hand the responsibility for scheduling transmissions which are scheduled on the radio interface between the respective distributed units and the communications devices may lie with the controlling node/central unit and/or the distributed units/TRPs. A communications device 14 is represented in FIG. 2 within the coverage area of the first communication cell 12. This communications device 14 may thus exchange signalling with the first central unit 40 in the first communication cell 12 via one of the distributed units 10 associated with the first communication cell 12.

It will further be appreciated that FIG. 2 represents merely one example of a proposed architecture for a new RAT based telecommunications system in which approaches in accordance with the principles described herein may be adopted, and the functionality disclosed herein may also be applied in respect of wireless telecommunications systems having different architectures.

Thus certain embodiments of the disclosure as discussed herein may be implemented in wireless telecommunication systems/networks according to various different architectures, such as the example architectures shown in FIGS. 1 and 2. It will thus be appreciated the specific wireless telecommunications architecture in any given implementation is not of primary significance to the principles described herein. In this regard, certain embodiments of the disclosure may be described generally in the context of communications between network infrastructure equipment/access nodes and a communications device, wherein the specific nature of the network infrastructure equipment/access node and the communications device will depend on the network infrastructure for the implementation at hand. For example, in some scenarios the network infrastructure equipment/access node may comprise a base station, such as an LTE-type base station 1 as shown in FIG. 1 which is adapted to provide functionality in accordance with the principles described herein, and in other examples the network infrastructure equipment may comprise a control unit/controlling node 40 and/or distributed control unit 41 and/or a TRP 10 of the kind shown in FIG. 2 which is adapted to provide functionality in accordance with the principles described herein.

Figure 3:
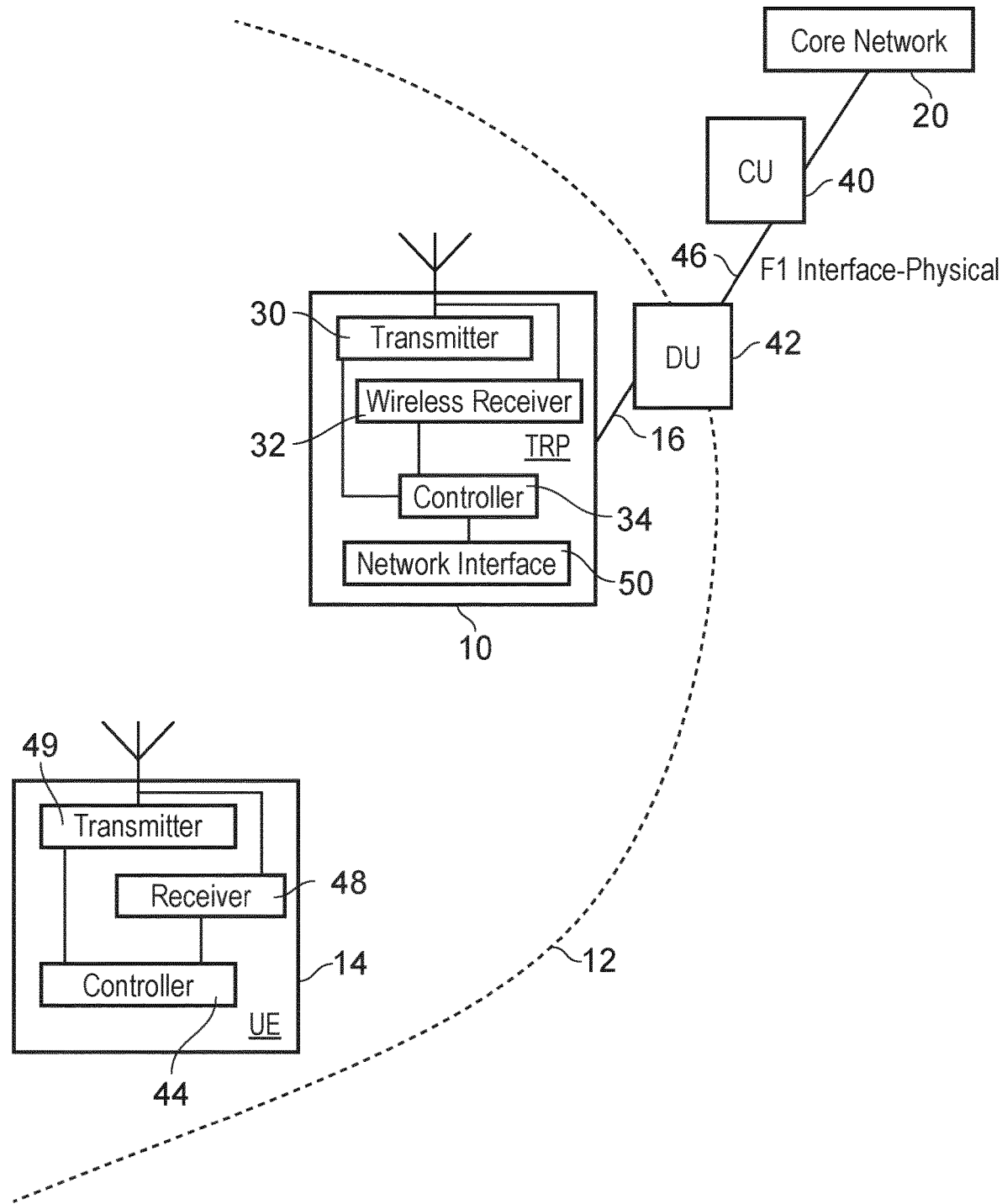
FIG. 3 is a schematic block diagram of an example infrastructure equipment and communications device which may be configured to operate in accordance with certain embodiments of the present disclosure.

A more detailed diagram of some of the components of the network shown in FIG. 2 is provided by FIG. 3. In FIG. 3, a TRP 10 as shown in FIG. 2 comprises, as a simplified representation, a wireless transmitter 30, a wireless receiver 32 and a controller or controlling processor 34 which may operate to control the transmitter 30 and the wireless receiver 32 to transmit and receive radio signals to one or more UEs 14 within a cell 12 formed by the TRP 10. As shown in FIG. 3, an example UE 14 is shown to include a corresponding transmitter 49, a receiver 48 and a controller 44 which is configured to control the transmitter 49 and the receiver 48 to transmit signals representing uplink data to the wireless communications network via the wireless access interface formed by the TRP 10 and to receive downlink data as signals transmitted by the transmitter 30 and received by the receiver 48 in accordance with the conventional operation.

The transmitters 30, 49 and the receivers 32, 48 (as well as other transmitters, receivers and transceivers described in relation to examples and embodiments of the present disclosure) may include radio frequency filters and amplifiers as well as signal processing components and devices in order to transmit and receive radio signals in accordance for example with the 5G/NR standard. The controllers 34, 44, 48 (as well as other controllers described in relation to examples and embodiments of the present disclosure) may be, for example, a microprocessor, a CPU, or a dedicated chipset, etc., configured to carry out instructions which are stored on a computer readable medium, such as a non-volatile memory. The processing steps described herein may be carried out by, for example, a microprocessor in conjunction with a random access memory, operating according to instructions stored on a computer readable medium. The transmitters, the receivers and the controllers are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the infrastructure equipment/TRP/base station as well as the UE/communications device will in general comprise various other elements associated with its operating functionality.

As shown in FIG. 3, the TRP 10 also includes a network interface 50 which connects to the DU 42 via a physical interface 16. The network interface 50 therefore provides a communication link for data and signalling traffic from the TRP 10 via the DU 42 and the CU 40 to the core network 20.

The interface 46 between the DU 42 and the CU 40 is known as the F1 interface which can be a physical or a logical interface. The F1 interface 46 between CU and DU may operate in accordance with specifications 3GPP TS 38.470 and 3GPP TS 38.473, and may be formed from a fibre optic or other wired high bandwidth connection. In one example the connection 16 from the TRP 10 to the DU 42 is via fibre optic. The connection between a TRP 10 and the core network 20 can be generally referred to as a backhaul, which comprises the interface 16 from the network interface 50 of the TRP10 to the DU 42 and the F1 interface 46 from the DU 42 to the CU 40.

Power Saving and Discontinuous Reception (DRX) in NR

In a typical currently deployed network, idle mode terminal devices are configured to monitor for paging messages periodically. For terminal devices (in connected and idle mode) operating in a discontinuous reception (DRX) mode this occurs when they wake up for their DRX wake time. Paging signals for a specific terminal device are transmitted in defined frames (Paging Frames)/sub-frames (Paging Occasions) which for a given terminal device may be derived from the International Mobile Subscriber Identifier (IMSI) of the terminal device, as well as paging related DRX parameters established in system information transmitted within the network. In connected mode, the terminal device is configured to periodically monitor PDCCH in groups of slots or subframes. If a PDCCH is not detected during the group of slots or subframes, the terminal device may sleep for the next cycle of the periodicity. Power saving is an important aspect of a user's experience of NR, which will influence the adoption of 5G handsets and/or services. DRX is one method of power saving for NR terminal devices.

Figure 4:
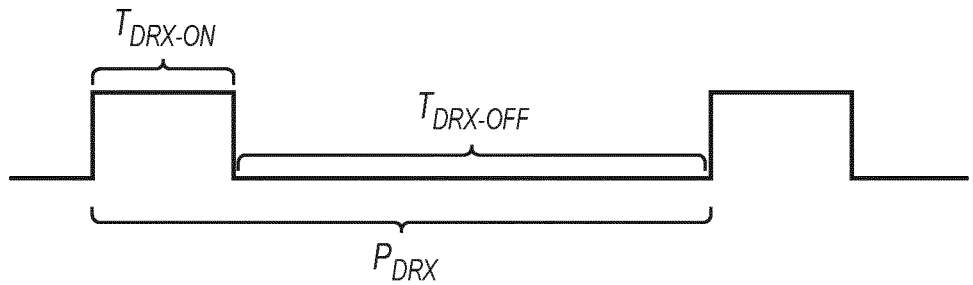
FIG. 4 shows an example of a discontinuous reception (DRX) cycle.

The basic DRX cycle is shown in FIG. 4, which consists of a DRX ON period of duration $T_{DRX-ON}$ and a period of inactivity, i.e. a DRX OFF period of duration $T_{DRX-OFF}$ where the DRX ON period occurs periodically at a DRX period, $P_{DRX}$. During the DRX ON period, the UE switches on its receiver to monitor for downlink traffic and switches off its receiver during the DRX OFF period to save power consumption. The DRX parameters $T_{DRX-ON}$ & $P_{DRX}$ are configured by the network. It should be appreciated by those skilled in the art that such a basic operation may not always be efficient, particularly if a UE frequently does not receive any signals during the ON period (or active operating mode) of the DRX operation.

Figure 5:
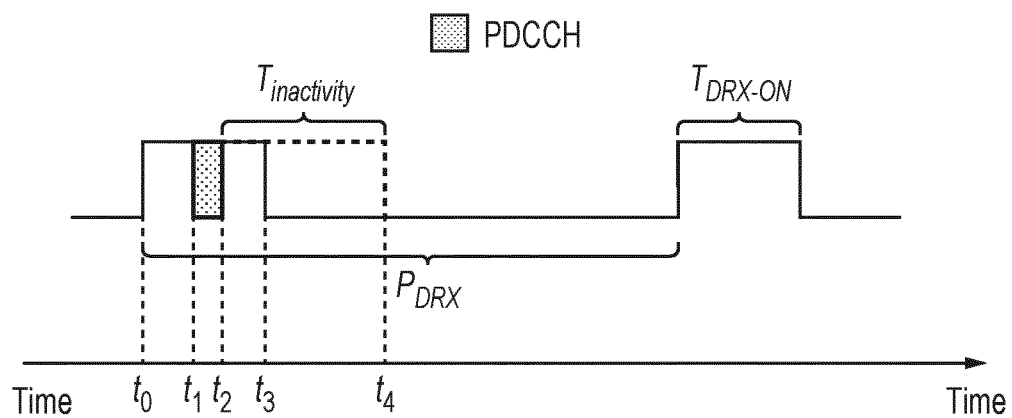
FIG. 5 shows an example of how an inactivity timer may be used during DRX.

If a PDCCH is detected for the UE during the DRX ON period, the UE starts an inactivity timer $T_{Inactivity}$ specifying a period in which the UE will remain awake (i.e. receiver is active) and continues to monitor for further downlink and/or uplink traffic, notably PDCCH. When the inactivity timer expires, the UE moves to the DRX OFF state. An example is shown in FIG. 5, where a PDCCH is detected at time $t_1$ of a DRX ON period, which triggers the inactivity timer which starts at time $t_2$ for a duration of $T_{Inactivity}$. When the timer expires at time $t_4$, the UE switches off its receiver. The inactivity period can extend beyond the DRX ON period; that is, the UE continues to stay awake after the DRX ON period as shown in FIG. 5 where the DRX ON ends at time $t_3$ and the inactivity period continues until time $t_4$. The rationale here is that if the UE receives a data packet, then it is likely it may receive another data packet in the near future and so if the UE receives a data packet towards the end of its DRX ON period, the inactivity timer will keep the UE awake to receive potential further data packets. If the UE receives a packet during the inactivity period, the inactivity timer will reset, i.e. the UE would extend its wake up duration due to the possibility of receiving yet further data packets.

Figure 6:
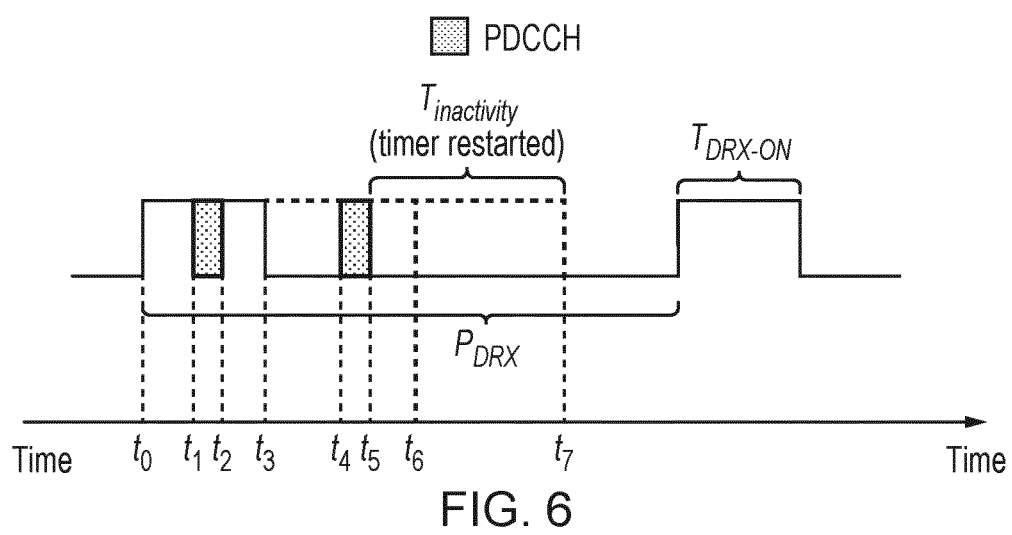
FIG. 6 shows an example of how an inactivity timer may be restarted when a further physical downlink control channel (PDCCH) is detected before the previous inactivity timer expires.

If during the inactivity period, the UE receives a further PDCCH, the inactivity timer is reset, i.e. restarted. It should be noted that the inactivity timer is only restarted here following a single successful decoding of the further PDCCH for a first transmission only; i.e. not when that further PDCCH is a retransmission. An example is shown in FIG. 6, where during a DRX ON period (between time to and $t_3$), a PDCCH is detected by the UE at time $t_1$ and so the inactivity timer starts after the PDCCH at time $t_2$ which expires at time $t_6$. During this first inactivity period, another PDCCH is detected at time $t_4$ which then resets the inactivity timer, i.e. the inactivity timer restarts after this PDCCH at time $t_5$ with a duration of $T_{inactivity}$. This follows the same rationale above; that if a data packet is transmitted for a UE then it is likely that another data packet would be transmitted for the same UE in the near future.

The inactivity timer is configured via RRC signalling by the network and can range from 0 ms to 2560 ms. In [3], some DRX parameters and $T_{inactivity}$ values are proposed for evaluation, which represent likely network configurations. Example values in [3] include 10 ms $T_{DRX-ON}$ with 200 ms $T_{inactivity}$, 8 ms $T_{DRX-ON}$ with 100 ms $T_{inactivity}$. It is observed that the inactivity period is typically significantly longer than the DRX ON duration, which would also consume significant battery power.

DRX may be further characterised (as is described in [4]) by an active time, which defines the total duration during which the UE monitors PDCCH, including the on duration DRX ON of the DRX cycle, the time during which the UE is performing continuous reception while the inactivity timer has not expired, and the time during which the UE is performing continuous reception while waiting for a retransmission opportunity. DRX may also be characterised by a retransmission timer, which signifies a duration until a retransmission can be expected. It would be appreciated by those skilled in the art that inactivity timers, on-duration timers, retransmission timers and the link are enumerated in units of subframes in LTE and in units of 1 ms, or sub-millisecond (i.e. 1/32 ms) in NR.

Short DRX Operation

Both NR and LTE support a short DRX mode of operation. The short DRX cycle may be optionally implemented within a long DRX (i.e. standard) cycle and follows the period where the inactivity timer is running. It is controlled by the following parameters:

drx-ShortCycle (optional): the Short DRX cycle; and
drx-ShortCycleTimer (optional): the duration the UE shall follow the Short DRX cycle.

Figure 7:
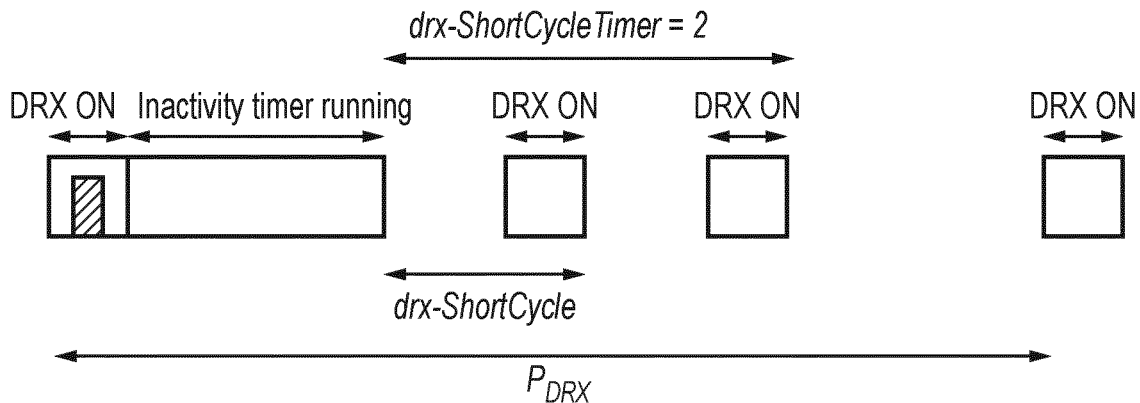
FIG. 7 shows a first example of a short DRX operation.

Operation of short DRX is described in the 3GPP Technical Specification 38.321 [5], in section 5.7. Some of the text herein describing the short DRX operation is reproduced and adapted from [5]. The principle of operation of "short DRX" is that PDCCH is monitored according to a DRX cycle once the inactivity period has expired. This is illustrated in FIG. 7 which shows the following aspects of short DRX operation:

If there has been activity in the initial DRX_ON period (as shown with the hashed box), the inactivity timer is started;

If there is no activity (no PDCCH received) during the running of the inactivity timer, the system enters into short DRX operation;

Short DRX has periods where the UE monitors PDCCH and periods where it doesn't. As can be seen, in the example of FIG. 7, the UE starts short DRX by not monitoring PDCCH;

Every drx-ShortCycle number of subframes, the UE monitors PDCCH for DRX_ON number of subframes. For example, if drx-ShortCycle=16 and DRX_ON=4, the UE monitors PDCCH for 4 subframes out of every 16. The subframes that the UE monitors for PDCCH are known to both the UE and the network;

The UE performs drx-ShortCycleTimer number of short DRX cycles. As can be seen, in the example of FIG. 7, drx-ShortCycleTimer=2;

If there is no activity during the short DRX operation, the UE goes to sleep and wakes up to monitor PDCCH after the end of the long DRX cycle (i.e. after $P_DRX$ subframes).

Figure 8:
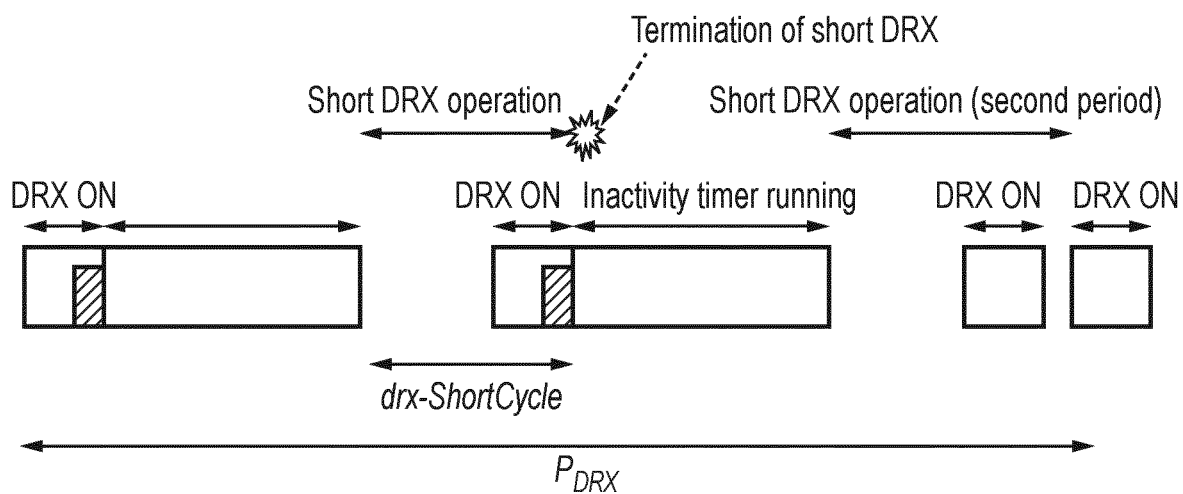
FIG. 8 shows a second example of a short DRX operation where an inactivity timer may be restarted during the initial short DRX operation.

If the UE decodes a PDCCH during one of the DRX_ON durations of the short DRX phase, the UE restarts its inactivity timer (and can then enter a second period of short DRX if there was no PDCCH activity during this second running of the inactivity timer). This operation is shown in FIG. 8. The duration of the inactivity timer and the parameters controlling short-DRX operation are configurable. At the extremes, the network can configure:

Inactivity timer=0: in this case, the UE transitions directly from DRX_ON to short-DRX;

Short-DRX not configured (as described above, short DRX is an optional feature): in this case, following expiry of the inactivity timer, the UE goes into sleep mode until the end of the period $P_{DRX}$ (i.e. until the end of the long DRX cycle).

Device-to-Device (D2D) and Sidelink Communications

Device-to-Device (D2D) communications is an aspect of mobile communications which has been established for devices to communicate directly with each other rather than via a wireless communications network. That is to say that radio signals representing data are transmitted via a wireless interface by one device and received by another to communicate that data, rather than the signals being transmitted to radio infrastructure equipment of a wireless communication network, which are then detected and decoded by the infrastructure equipment to recover that data and communicated on to a destination device.

Figure 9:
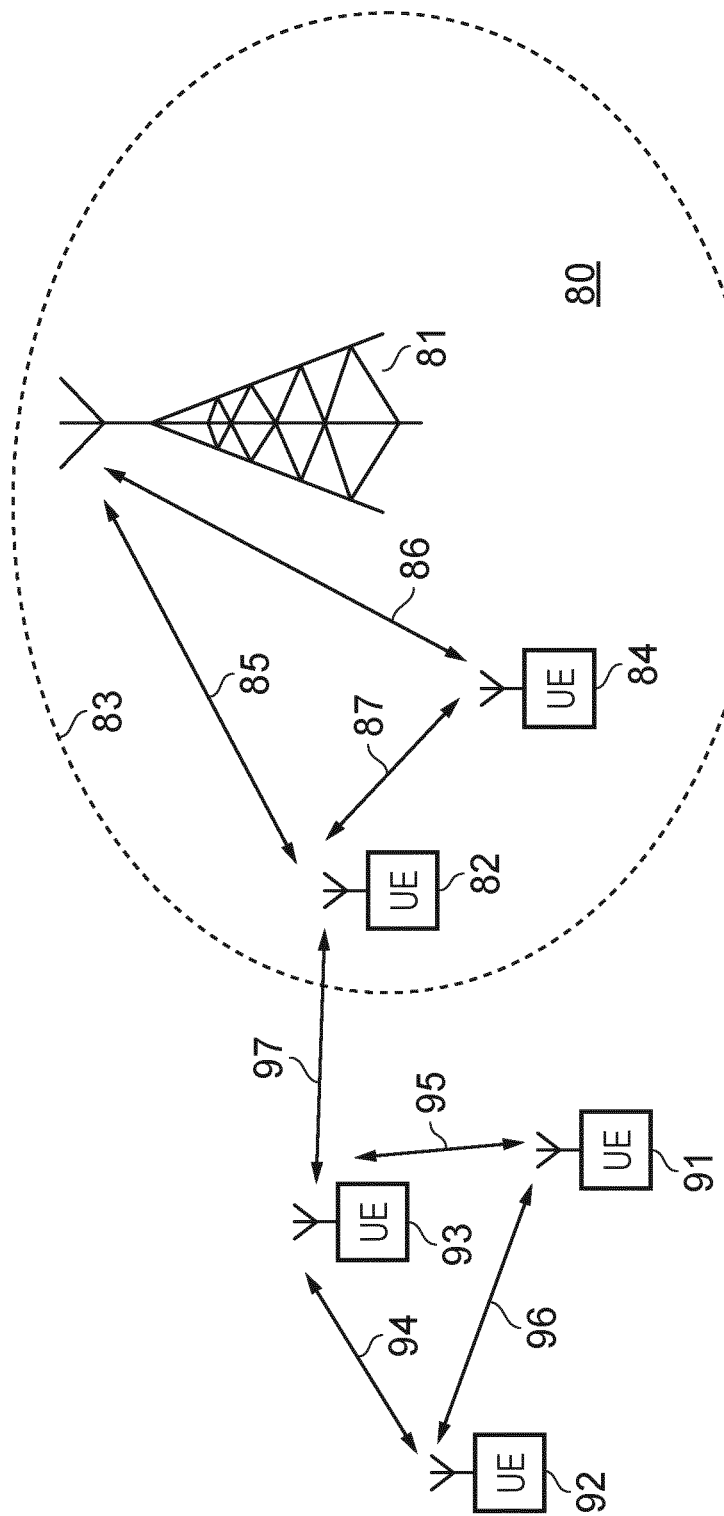
FIG. 9 schematically represents examples of communications devices communicating with each other in accordance with different examples of device-to-device (D2D) communications.

D2D communications can take different forms, which are illustrated in FIG. 9. As shown in FIG. 9, in one example two communications devices (UEs) 82, 84 are operating within a coverage area of a cell 80 provided by radio infrastructure equipment 81, which has a cell boundary 83 represented by a dashed line. The radio infrastructure equipment 81 may for example be a TRP 10 such as that shown in FIG. 2. As represented by dashed lines 85, 86, the UEs 82, 84, may transmit and receive signals to the infrastructure equipment 81 to transmit or to receive data on an uplink or a downlink respectively of a wireless access interface formed by a wireless communications network of which the infrastructure equipment 81 forms part. However within the radio coverage area of the cell 80 the UEs 82, 84 may communicate directly between one another via a D2D wireless access interface as represented by a dashed line 87. The UEs 82, 84 can be configured to transmit and to receive signals via a D2D wireless access interface which may be separate and not shared or overlap a frequency band of the wireless access interface provided by the infrastructure equipment 81. Alternatively the UEs 82, 84 may transmit and receive signals via a part of the wireless access interface provided by the infrastructure equipment 81. A D2D wireless access interface formed for one UE to transmit radio signals to another UE is referred to as a sidelink or PC5.

Another example of D2D communications is also shown in FIG. 9 where UEs fall outside a coverage area of a wireless communication network and so communicate directly with one another. As represented by dashed lines 94, 95, 96, three UEs 91, 92, 93 are operable to transmit and receive signals representing data via sidelinks. These sidelinks 94, 95, 96 may be formed by a D2D wireless access interface which falls within a frequency band of the infrastructure equipment 81 or may be outside this frequency band. However the UEs 91, 92, 93 organise access to a D2D wireless access interface autonomously without reference to a wireless access interface. In some cases, the UEs 91, 92, 93 may be pre-configured with some parameters for a D2D wireless access interface. As another example, one of the UEs 82 within the coverage area of the cell 80 acts as a relay node for one or more of the UEs 91, 92, 93 which are outside the coverage area as represented by a sidelink 97.

Here D2D communications of the form of sidelink 87 are referred to as in-coverage communications, D2D communications of the form of sidelink 97 are referred to as partial coverage communications, and D2D communications of the form of sidelinks 94, 95, 96 are referred to as out-of-coverage communications.

According to 3GPP standards such as LTE, whilst downlink and uplink communications are specified for transmissions from an infrastructure equipment such as a gNB to a UE and from a UE to a gNB respectively, sidelink communications are specified to realise UE-to-UE (device-to-device (D2D)) communication, especially for sidelink discovery, sidelink communication and vehicle to everything (V2X) sidelink communication between UEs. The LTE sidelink has the following characteristics as described below, which are reproduced from [4]:

Sidelink comprises sidelink discovery, sidelink communication, and V2X sidelink communication between UEs;

Sidelink uses uplink resources and a physical channel structure similar to uplink transmissions. However, some changes, noted below, are made to the physical channels;

The sidelink/D2D wireless access interface structure includes a physical sidelink control channel (PSCCH) for UEs to transmit control signalling to other UEs and a physical sidelink shared channel (PSSCH) for transmitting data to other UEs. Control messages transmitted on the PSCCH can indicate communications resources of the PSSCH via which the UE will transmit data to another UE. The control message for sidelink is referred to as sidelink control information (SCI). Therefore the PSCCH is mapped to the sidelink control resources and indicates resource and other transmission parameters used by a UE for PSSCH;

Sidelink transmission uses the same basic transmission scheme as the uplink transmission scheme. However, sidelink is limited to single cluster transmissions for all the sidelink physical channels. Furthermore, sidelink uses a one symbol gap at the end of each sidelink sub-frame. For V2X sidelink communication, PSCCH and PSSCH are transmitted in the same subframe;

The sidelink physical layer processing of transport channels differs from uplink transmission in the following steps:
Scrambling: for PSDCH and PSCCH, the scrambling is not UE-specific; and
Modulation: 256 QAM is not supported for sidelink. 64 QAM is only supported for V2X sidelink communication;

For PSDCH (physical sidelink discovery channel), PSCCH and PSSCH demodulation, reference signals similar to uplink demodulation reference signals are transmitted in the fourth symbol of the slot in normal cyclic prefix (CP) and in the third symbol of the slot in extended cyclic prefix. The sidelink demodulation reference signals sequence length equals the size (number of sub-carriers) of the assigned resource. For V2X sidelink communication, reference signals are transmitted in the third and sixth symbols of the first slot and the second and fifth symbols of the second slot in normal CP;

For PSDCH and PSCCH, reference signals are created based on a fixed base sequence, cyclic shift and orthogonal cover code. For V2X sidelink communication, the cyclic shift for PSCCH is randomly selected in each transmission;

For in-coverage operation, the power spectral density of the sidelink transmissions can be influenced by the eNB; and For measurement on the sidelink, the following basic UE measurement quantities are supported:
Sidelink reference signal received power (S-RSRP);
Sidelink discovery reference signal received power (SD-RSRP);
PSSCH reference signal received power (PSSCH-RSRP); and
Sidelink reference signal strength indicator (S-RSSI).

Currently, for 5G or New Radio (NR) standardisation, a sidelink has been specified in Release-16 for V2X communication, with the LTE sidelink being a starting point for the NR sidelink. For NR sidelink, the following sidelink physical channels are defined:
Physical Sidelink Shared Channel (PSSCH);
Physical Sidelink Broadcast Channel (PSBCH);
Physical Sidelink Control Channel (PSCCH); and
Physical Sidelink Feedback Channel (PSFCH).

Furthermore, the following sidelink physical signals are defined:
Demodulation reference signals (DM-RS);
Channel-state information reference signal (CSI-RS);
Phase-tracking reference signals (PT-RS);
Sidelink primary synchronization signal (S-PSS); and
Sidelink secondary synchronization signal (S-SSS).

NR sidelink can be enhanced with a power saving mechanism for sidelink which would be a useful feature especially for D2D (device-to-device) communications between devices having limited battery power.

A UE is provided by RRC signalling a bandwidth part (BWP) for SL transmissions (SL BWP) and a resource pool. This is typically done by the base station if the UE is in coverage or reachable by a relay node, but for some corner cases where it is known a UE will be or is likely to be out of coverage or reach by a base station, the SL BWP and resource pool may be hardcoded (preconfigured) onto the UE's SIM, for example. The resource pool is configured within the SL BWP. For the resource pool, the UE is provided a number of sub-channels where each sub-channel includes a number of contiguous physical resource blocks (PRBs). The sub-channel is defined as the minimum granularity in the frequency domain for transmission and reception of sidelink in the unit of PRB. The first PRB of the first sub-channel in the SL BWP is indicated. Hence the UE only needs to monitor those sub-channels that have been indicated, reducing the search space and number of blind decodes necessary at the UE. A slot is the time-domain granularity for a resource pool. Available slots for a resource pool are provided by RRC signalling and occur with a periodicity. For each periodicity, the RRC signalling may be bitmap signalling or indication of starting slot and length. A UE may be configured with an Rx (reception) resource pool and a Tx (transmission) resource pool separately. The Rx resource pool may be used for PSCCH monitoring at a Rx UE. Here, those skilled in the art would appreciate that a BWP (which is well known in the art as a power saving scheme for a UE) is a part of a carrier bandwidth providing a number of contiguous physical resource blocks (PRBs) which can be grouped to form a BWP in NR. Multiple BWPs can exist within a carrier bandwidth, but only one BWP is activated per UE at a given time.

Figure 10:
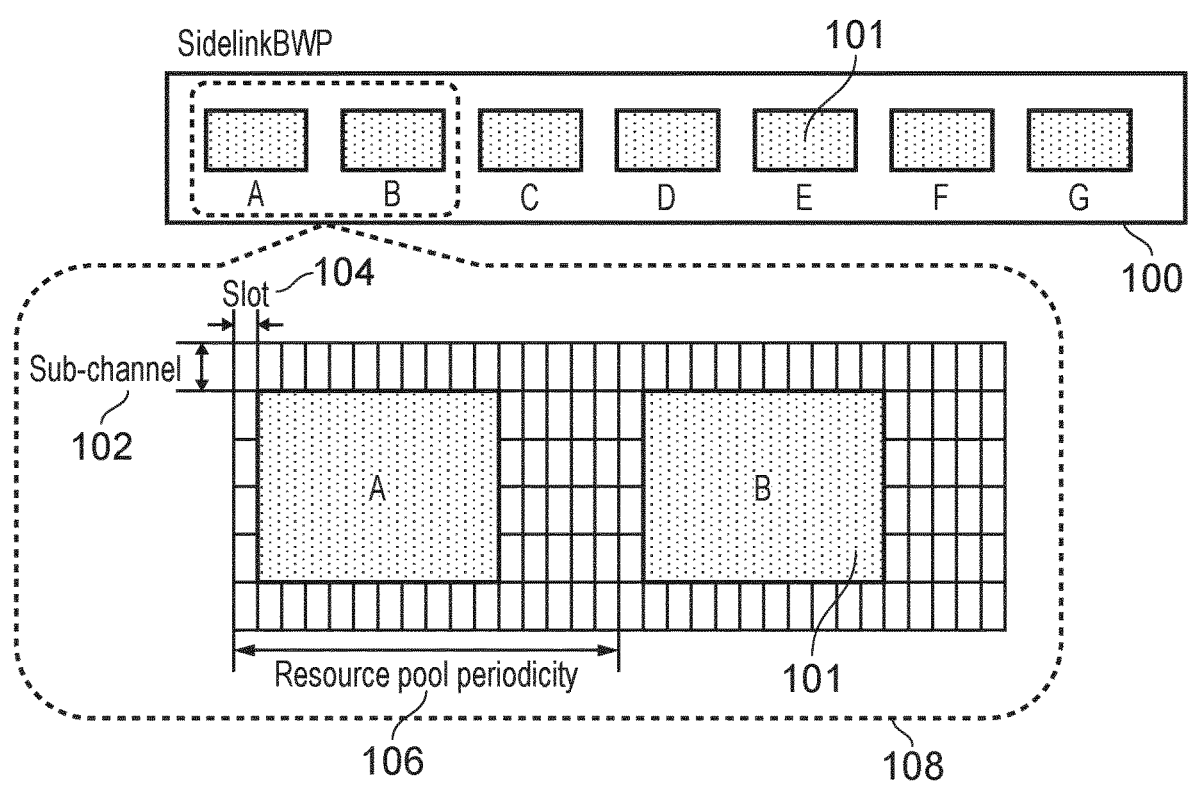
FIG. 10 shows an example of resource pool configuration for sidelink communications.

FIG. 10 shows an example of resource pool configuration in a sidelink BWP 100. Each instance of the resource pool 101 (labelled A to G) consists of four sub-channels 102 and ten slots 104 starting from the second slot of the resource pool periodicity, where the resource pool periodicity 106 is sixteen slots; i.e. the start of each instance of the resource pool 101 is sixteen slots from the start of the previous resource pool instance. Sidelink BWP portion 108 is a zoomed in portion of overall sidelink BWP 100, showing more clearly how two resource pool instances 101 (A and B) are made up from four sub-channels 102 and ten slots 104, with the periodicity 106 of sixteen slots being clearly seen. It should be noted that each instance of the resource pool within the periodicity may consist of non-contiguous slots in the time domain.

NR sidelink supports broadcast, groupcast and unicast (i.e. three "cast types" are supported). For SL broadcast, a UE transmits data to unspecified UEs which are close to the transmitter UE. The SL broadcast may be suitable for alert indication. For SL unicast, a UE transmits data to a specified UE. To realise the unicast transmission, SCI (sidelink control information) includes a destination ID (i.e. identifier of a receiver UE) and a source ID (i.e. identifier of a transmitter UE). For SL groupcast, a UE transmits data to one or more specified UEs within the same group. SL groupcast may be suitable for a platooning application which is a method for driving a group of vehicles together. To realise the groupcast transmission, SCI includes a destination group ID (i.e. identifier of a group to be received) and a source ID.

The UE needs to be able to save power in V2X. This is particularly relevant to pedestrian UEs, as these are typically connected to far smaller batteries than UEs which are implemented in vehicles. In sidelink communications, the UE monitors for activity within resource pools, which may be quite large, covering more than one time slot and multiple resources in the frequency domain. Embodiments of the present technique seek to overcome these issues by allowing for a UE to monitor fewer resources, enabling enhanced power saving by a UE in V2X.

Sidelink Monitoring of a Subset of Resources for Power Saving

Figure 11:
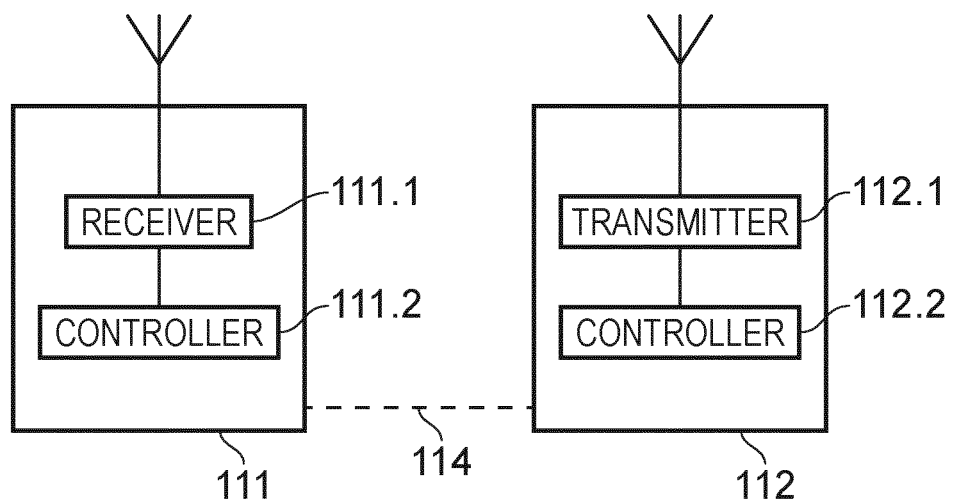
FIG. 11 shows a schematic representation of a wireless communications network comprising a communications device and an infrastructure equipment in accordance with embodiments of the present technique.

FIG. 11 shows a schematic representation of a wireless communications system comprising a plurality of communications devices 111, 112 in accordance with embodiments of the present technique. The communications devices 111, 112 each comprise a controller (or controller circuitry) 111.2, 112.2, which may be, for example, a microprocessor (s), a CPU(s), a chip(s), or a dedicated chipset(s), etc.

The communications device 111, which is a receiving communications device 111, comprises a receiver (or receiver circuitry) 111.1 configured to receive signals from one or more of a plurality of other communications devices (such as communications device 112) within sidelink communications resources of a plurality of instances of a resource pool of a sidelink interface 114, where the resource pool is formed of a plurality of time-divided slots and a plurality of frequency-divided regions. Each of the resource pool instances may be temporally discrete (i.e. each resource pool instance is separate in time) from the others of the resource pool instances, or there may be some temporal overlap between the resource pool instances.

Similarly, the other communications device 112, which is a transmitting communications device (and which may be one of a plurality of other communications devices 112 to the communications device 111), comprises a transmitter (or transmitter circuitry 112.1) configured to transmit signals to a receiving communications device (such as communications device 111) of a plurality of other communications devices within the sidelink communications resources of the plurality of instances of the resource pool of the sidelink interface 114.

It should be appreciated by those skilled in the art that the receiver 111.1 and the transmitter 112.1 may each be a standalone receiver or transmitter, or may form part of a transceiver (or transceiver circuitry, and which is not shown in FIG. 11) capable of transmitting and receiving signals. The communications device 111 may also comprise a separate transmitter, and/or the communications device 112 may also comprise a separate receiver (not shown in FIG. 11).

Essentially, at least some embodiments of the present technique propose that a UE only monitors a restricted set of resources within the resource pool to save power. The restricted set of resources that is monitored may depend on the UE's previous activity. In other words, the receiving communications device is configured to monitor for one or more first current signals transmitted by at least a first transmitting communications device of the other communications devices to the receiving communications device in a first subset of the time-divided slots and the frequency-divided regions of the resource pool during a first of the resource pool instances. Here, the first subset is dependent on which of the time-divided slots and the frequency-divided regions of the resource pool in which one or more first previous signals were received by the receiving communications device from the first transmitting communications device during a second of the resource pool instances during which the receiving communications device is configured to monitor a larger number of the time-divided slots of the resource pool than in the first subset and/or a larger number of the frequency-divided regions of the resource pool than in the first subset, wherein the second resource pool instance is a preceding resource pool instance to the first resource pool instance. Here, when monitoring this larger number of time-divided slots/frequency-divided regions, the receiving communications device may be configured to monitor the entire resource pool (i.e. all of the time-divided slots and all of the frequency-divided regions), or the receiving communications device may be configured to monitor a larger subset of the resource pool, where this larger subset comprises the first subset.

The restricted set of resources that is monitored may in some arrangements of embodiments of the present technique be a function of resources that were used to communicate to the UE previously. For example, in a simple arrangement (which is described in further detail below with reference to FIG. 14), the resources that are monitored in a future resource pool are the same as the resources that were used in a previous resource pool. In a more complicated arrangement (described in further detail below), the resources used in a future resource pool may be, for example, frequency-hopped relative to the resources used in a previous resource pool.

Figure 12:
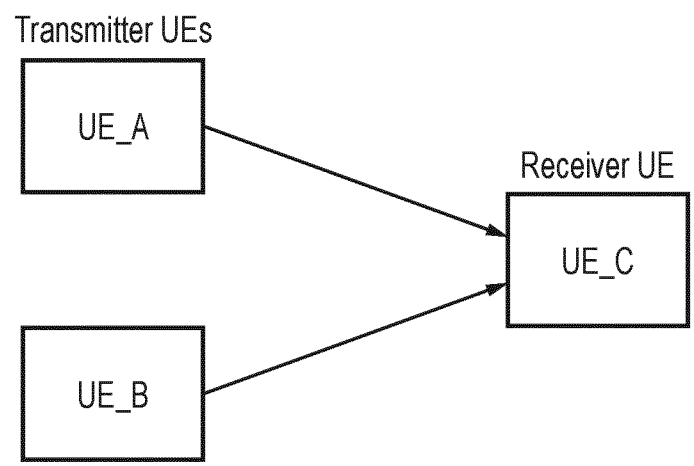
FIG. 12 shows a first arrangement of transmitting/receiving communications devices in accordance with at least some embodiments of the present technique.

FIG. 12 shows an arrangement of transmitting/receiving communications devices in accordance with at least some embodiments of the present technique. Here, there is one receiver UE, which is labelled (and referred to in further detail below) as UE_C, and two transmitter UEs which are labelled (and referred to in further detail below) as UE_A and UE_B. With reference to FIG. 11, UE_C can be deemed to be broadly equivalent to the communications device 111, and either of UE_A and UE_B can be deemed to be broadly equivalent to the communications device 112. The receiver UE, UE_C, saves power by monitoring a restricted set of resources (according to the various arrangements of the embodiments of the present technique described below) and the transmitter UEs, UE_A and/or UE_B, communicate with the receiver UE, UE_C, according to the known restricted set of resources that UE_C is monitoring. Certain aspects of the arrangements of embodiments of the present technique described below explain in further detail how the transmitter UEs, UE_A and UE_B, know which set of restricted resources the receiver UE, UE_C, is monitoring, and the behaviour of each of these UEs.

Monitoring Portion of Resource Pool after Activity

Figure 13:
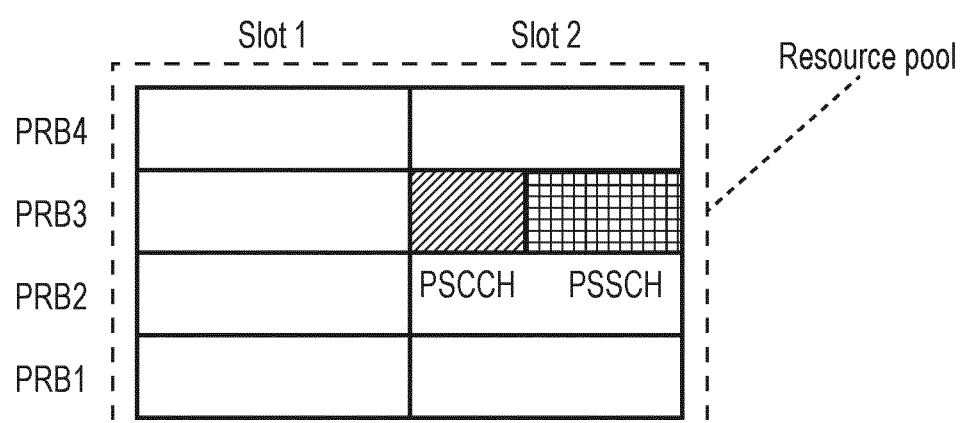
FIG. 13 illustrates an example of a sidelink resource pool consisting of multiple PRBs and multiple slots in accordance with embodiments of the present technique.

A resource pool may consist of multiple timeslots and multiple frequency resources (PRBs), as shown in FIG. 13. It should be noted that sub-channels, as explained with reference to FIG. 10, can be used instead of the PRBs. While FIG. 13 shows the PSCCH and PSSCH occupying a single PRB in the frequency domain, those skilled in the art would appreciate that these channels could typically occupy multiple PRBs. Furthermore, while FIG. 13 shows the resource pool being formed of two slots (also referred to herein as time-divided slots) in the time domain and four PRBs (also referred to herein as frequency-divided regions), it should be appreciated that a resource pool may be formed of fewer or more time-slots or PRBs/sub-channels. The 2-by-4 resource pool shown in FIG. 13 is shown in later figures and described in later arrangements of embodiments of the present technique for ease of understanding.

In at least some arrangements of embodiments of the present technique, a receiver UE (i.e. UE_C) only monitors that region of a resource pool in which it had previously received a communication. In other words, the time-divided slots and the frequency-divided regions of the first subset are the same as the time-divided slots and the frequency-divided regions of the resource pool in which the one or more first previous signals were received during the second resource pool instance.

Figure 14:
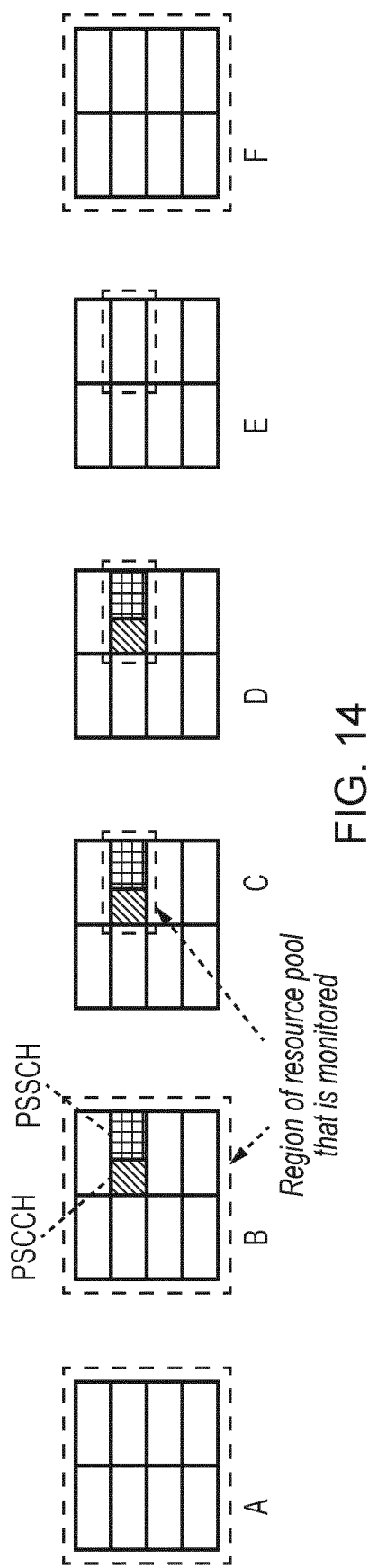
FIG. 14 illustrates an example of how a UE may monitor a region of a resource pool within which it was previous communicated to in accordance with embodiments of the present technique.

An example of this mode of operation is shown in FIG. 14. FIG. 14 shows six consecutive instances of a sidelink resource pool, labelled A to F. The operation of UE_C in each instance is further described below:

A: UE_C has not previously been communicated with and monitors the entire resource pool;

B: UE_C monitors entire resource pool. In this instance, a transmitter UE, UE_B, communicates with UE_C on PSCCH and PSSCH channels in slot 2/PRB 3 (see FIG. 13 for the numbering of the slots and PRBs). In other words, UE_C detects PSCCH for the UE_C on slot 2/PRB 3 in resource pool B;

C, D: UE_C only monitors PSCCH/PSSCH in slot 2/PRB 3, since these are the resources that were used for communication in the previous instance of the resource pool. In other words, UE_C monitors restricted resource(s) based on the previous detected PSCCH in the past resource pool. UE_C receives PSCCH/PSSCH;

E: The UE_C only monitors PSCCH/PSSCH in slot 2/PRB 3, since these are the resources that were used for communication in the previous instance of the resource pool. In other words, UE_C monitors restricted resource(s) based on the previous detected PSCCH in the past resource pool. UE_C does not receive any communication in these resources; and F: UE_C monitors the entire resource space since it did not receive any communication in the previous instance of the resource pool. Here, in other words, if the receiving communications device does not receive any of the one or more first current signals in the first subset during the first resource pool instance, the receiving communications device is configured to monitor a larger number of the time-divided slots of the resource pool than in the first subset and/or a larger number of the frequency-divided regions of the resource pool than in the first subset for one or more first next signals during a third of the resource pool instances, wherein the third resource pool instance is a subsequent resource pool instance to the first resource pool instance. Here, when monitoring this larger number of time-divided slots/frequency-divided regions, the receiving communications device may be configured to monitor the entire resource pool (i.e. all of the time-divided slots and all of the frequency-divided regions), or the receiving communications device may be configured to monitor a larger subset of the resource pool, where this larger subset comprises the first subset.

In the above-described arrangement described with reference to FIG. 14, the receiver UE, UE_C, is shown to only be monitoring (in resource pool instances C, D, and E) the exact resources in the time and frequency domain that it was last communicated with. It should be appreciated that the receiver UE, UE_C, could alternatively monitor the whole slot it was last communicated with or a range of frequency resources including those frequency resources it was last communicated with. In other words, all of the frequency-divided regions of the resource pool and a portion of the plurality of time-divided slots of the resource pool comprising those in which the one or more first previous signals were received during the second resource pool instance could be monitored, or alternatively, all of the time-divided slots of the resource pool and a portion of the plurality of frequency-divided regions of the resource pool comprising those in which the one or more first previous signals were received during the second resource pool instance could be monitored.

Figure 15:
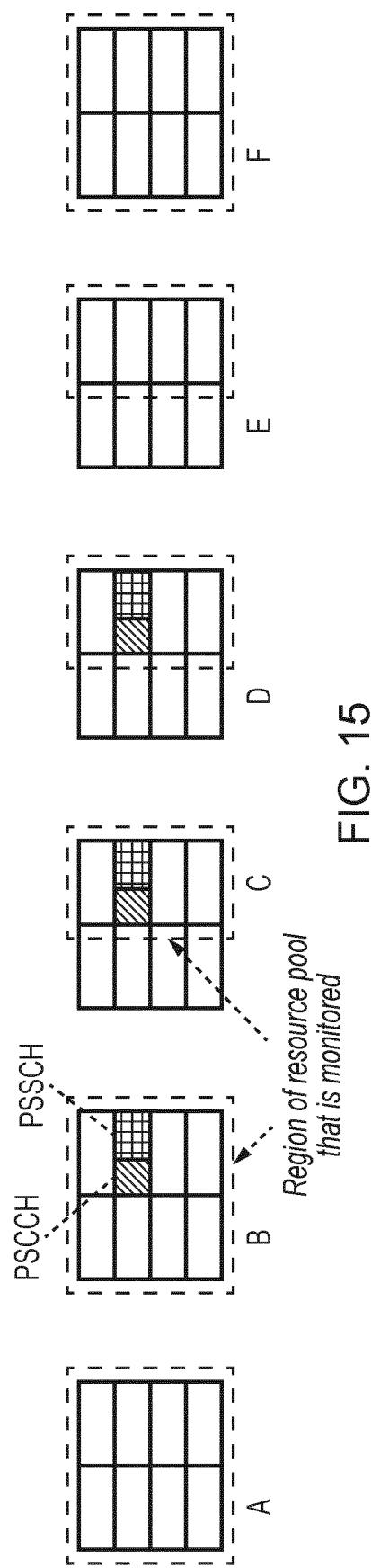
FIG. 15 illustrates an example of how a UE may monitor a subset of time-slots of a resource pool within which it was previously communicated to in accordance with embodiments of the present technique.

FIG. 15 shows the receiver UE, UE_C, monitoring the same slot within a resource pool that it was last communicated with. In other words, in the example shown in FIG. 15, the first subset comprises all of the plurality of frequency-divided regions of the resource pool and only the time-divided slots of the resource pool in which the one or more first previous signals were received during the second resource pool instance.

Figure 16:
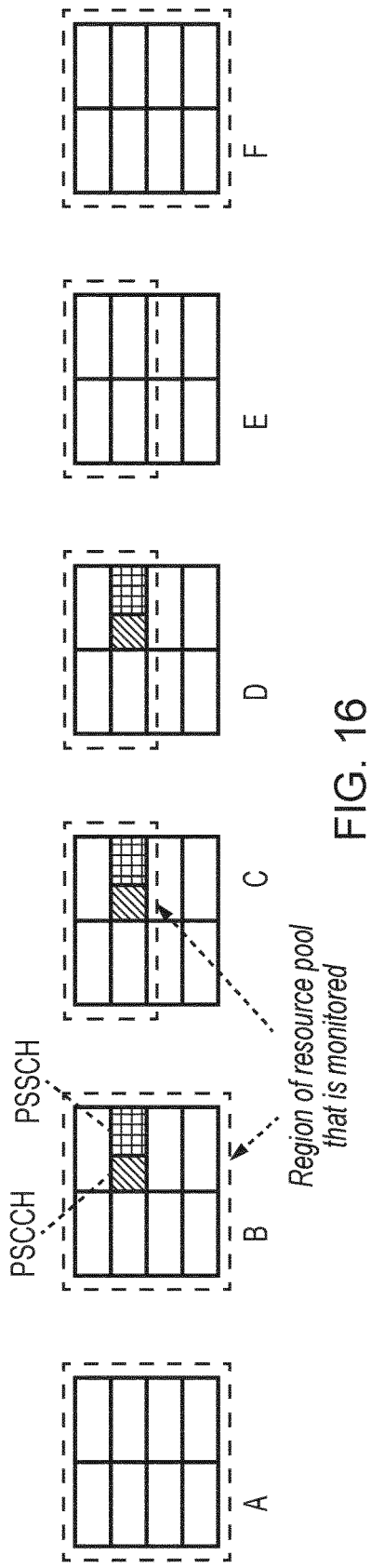
FIG. 16 illustrates an example of how a UE may monitor a subset of frequencies of a resource pool within which it was previously communicated to in accordance with embodiments of the present technique.

FIG. 16 shows the receiver UE, UE_C, monitoring the same range of frequencies (in this case PRB3 and PRB4) with which it was last communicated with. In other words, in the example of FIG. 16, the first subset comprises all of the plurality of time-divided slots of the resource pool and only the frequency-divided regions of the resource pool in which the one or more first previous signals were received during the second resource pool instance.

Those skilled in the art would appreciate that in some arrangements of embodiments of the present technique, the receiver UE, UE_C, may monitor a number of time-slots/PRBs which is more than those with which it was last communicated in, but less than a total amount that form the resource pool.

It should be appreciated that the receiver UE, UE_C, is able to reduce power consumption in such cases as described above with reference to FIGS. 15 and 16 by either switching off for a longer period of time (in FIG. 15 the UE_C's receiver is only activated for one out of two slots in instances C, D, E) or being able to operate with a narrower receiver bandwidth (in FIG. 16, the UE_C receives in only half the resource pool bandwidth in instances C, D, E compared to when the whole resource pool is monitored).

Above-described arrangements provide relatively simple solutions in which the restricted resources that are monitored in a future resource pool are the same as those monitored in a previous resource pool. In other arrangements of embodiments of the present technique, the restricted resources that are monitored in a future resource pool may be a function of those monitored in a previous resource pool. In other words, the time-divided slots and the frequency-divided regions of the first subset are a function of the time-divided slots and the frequency-divided regions of the resource pool in which the one or more first previous signals were received during the second resource pool instance.

A first implementation of such arrangements involves frequency (resource) hopping. The resources that are monitored in a future resource pool are related in the frequency domain to those used in a previous resource pool. In other words, the function is a frequency hopping function, wherein the time-divided slots of the first subset are the same as the time-divided slots in which the one or more first previous signals were received, and wherein the frequency-divided regions of the first subset are the same as a number of the frequency-divided regions of the resource pool in which the one or more first previous signals were received during the second resource pool instance and the frequency-divided regions of the first subset are shifted in frequency by one or more frequency-divided regions, with respect to the frequency-divided regions of the resource pool in which the one or more first previous signals were received during the second resource pool instance, in accordance with the frequency hopping function.

For example, in at least some examples, if the receiver UE is communicated with using PRB (or sub-channel) n in resource pool instance r, the receiver UE, UE_C, monitors PRB $((n-1)+i*n_{PRB}/2)$ mod $n_{PRB}+1$ in resource pool instance r+i, where $n_{PRB}$ is the number of PRBs in the resource pool. For example, in the example illustrated by FIG. 17, $n_{PRB}=4$ and:

The receiver UE, UE_C, is communicated with using PRB 3 in resource pool instance r=1; and In the following resource pool, r+1=2, the receiver UE, UE_C, monitors for PSCCH/PSSCH in PRB (2+1*4/2) mod 4+1=1.

It should be noted here that such frequency hopping can provide a frequency diversity benefit; if it is not possible to communicate with the receiver UE using one frequency, it might be possible to communicate with the UE using another frequency.

A second implementation of such arrangements involves timeslot hopping. In other words, the function is a time hopping function, wherein the frequency-divided regions of the first subset are the same as the frequency-divided regions in which the one or more first previous signals were received, and wherein a number of the time-divided slots of the first subset is the same as a number of the time-divided slots of the resource pool in which the one or more first previous signals were received during the second resource pool instance and the time-divided slots of the first subset are shifted in time by one or more time-divided slots, with respect to the time-divided slots of the resource pool in which the one or more first previous signals were received during the second resource pool instance, in accordance with the time hopping function.

Figure 18:
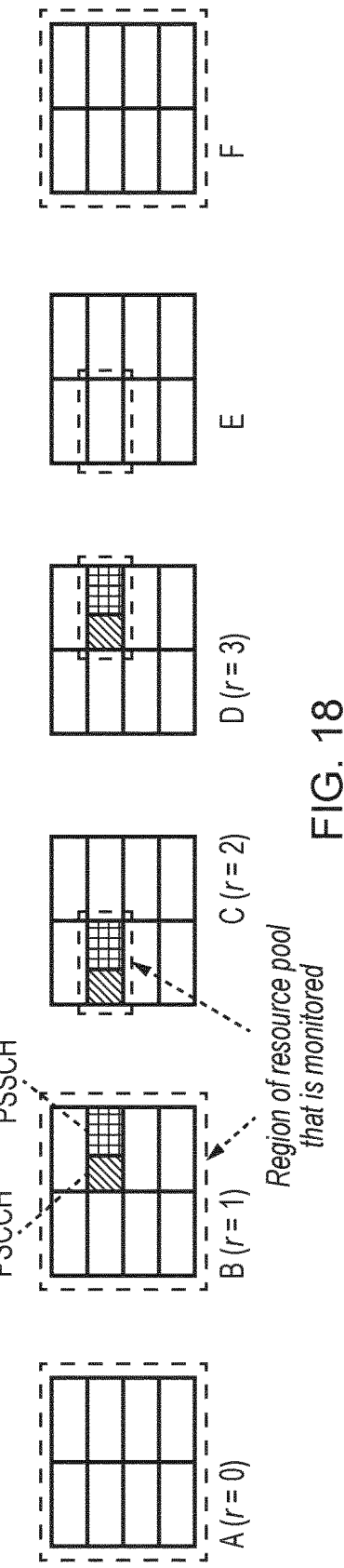
FIG. 18 illustrates an example of timeslot hopping of monitored resources in accordance with embodiments of the present technique.

The resource pool may consist of multiple timeslots and in this implementation, if the UE is communicated with using the first timeslot of the resource pool in resource pool instance r, it is communicated with using the second timeslot in resource pool instance r+1. This implementation is illustrated by FIG. 18. Such timeslot hopping can provide a diversity benefit in the case of interference; if many UEs communicate with the first timeslot of a resource pool, a diversity benefit can be achieved by switching to communicating with the second timeslot of the resource pool.

Figure 17:
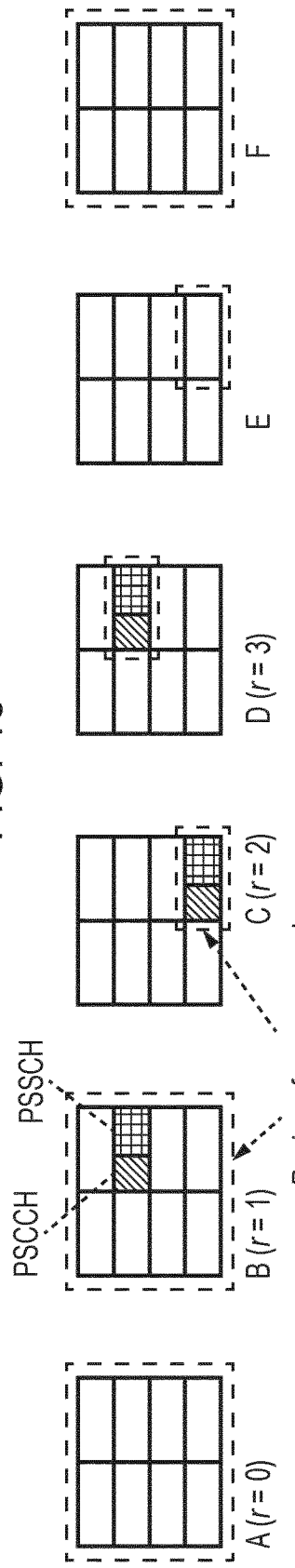
FIG. 17 illustrates an example of frequency hopping of monitored resources in accordance with embodiments of the present technique.

The main motivation for the arrangements described with reference to FIGS. 17 and 18 for frequency and time hopping the monitored resources is the diversity benefit. However, in other arrangements of embodiments of the present technique, a motivation for frequency or time hopping monitored resources may be collision avoidance. It is possible that there are two transmitter UEs (UE_A and UE_B) and both of these transmitter UEs might choose the same resource to transmit. In this case, the transmissions from the two transmitter UEs, UE_A and UE_B can collide. Hence it can be beneficial if, in a future resource pool instance, the resources that a transmitter UE uses are hopped relative to the resources that were used in an earlier resource pool instance, such that if a collision occurs between transmissions from multiple transmitter UEs in a first resource pool instance, after time/frequency hopping by one or more of these UEs, such a collision may not happen in the next resource pool instance. Of course, the hopping patterns here must be different for the transmitter UEs that transmit the colliding signals; otherwise the signals would simply collide again in the next resource pool instance after the frequency/time hopping. Here:

A receiver UE, UE_C, monitors more than one set of resources in a resource pool;

The transmitter UE, UE_A or UE_B, may know the set of resources that the receiver UE is monitoring (for example, either one of the transmitter UEs or the receiver UE may include information on the power saving state of the receiver UE in control signalling that is transferred between these UEs);

A first transmitter UE, UE_A uses a first hopping pattern for transmission of sidelink resources;

A second transmitter UE, UE_B, uses a second hopping pattern for transmission of sidelink resources; and Therefore, the receiver UE, UE_C, monitors both the first and second hopping patterns for transmission of sidelink.

Figure 19:
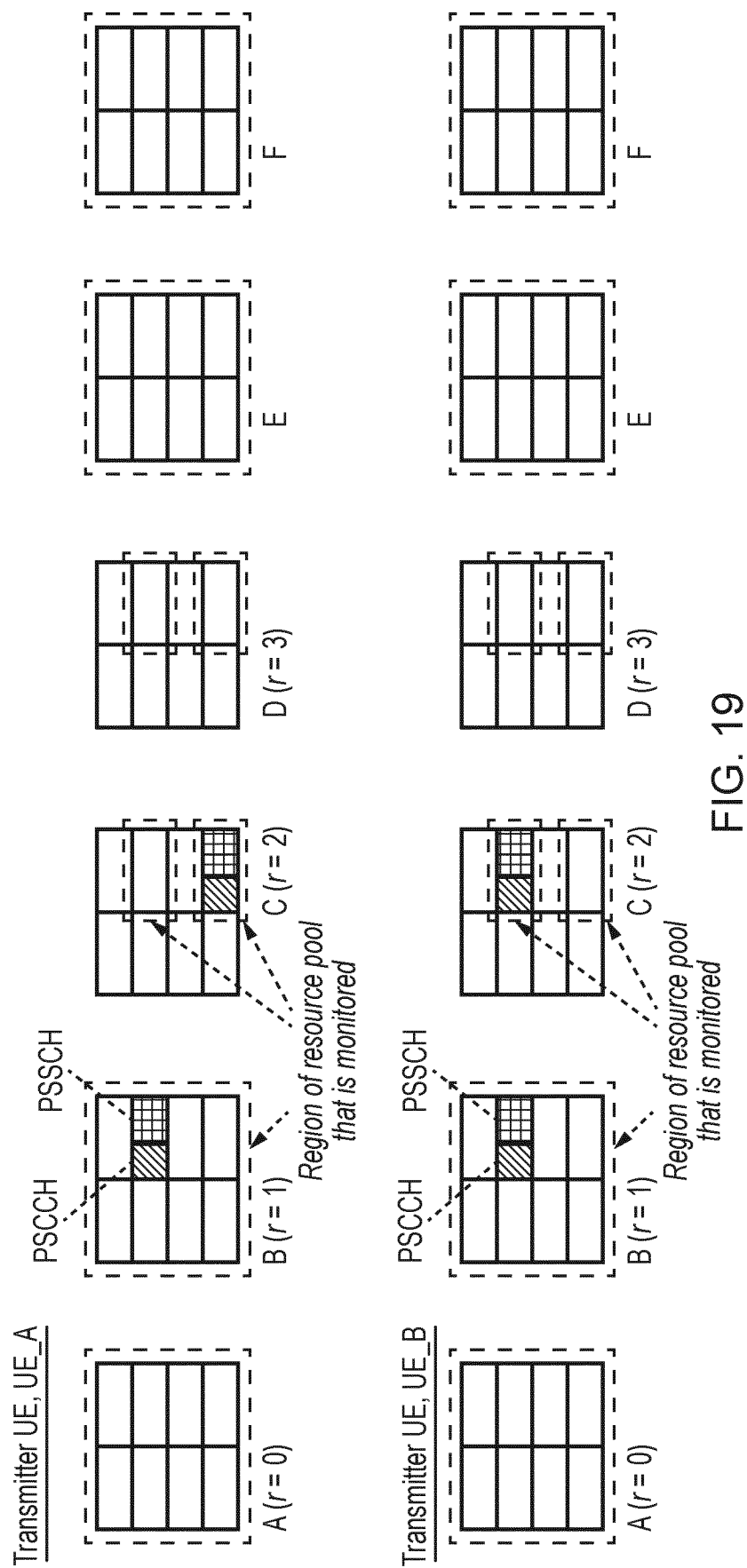
FIG. 19 shows how different transmitter UEs may hop their future transmissions independently in accordance with embodiments of the present technique

In other words, the receiving communications device is configured to monitor for one or more second current signals transmitted by a second transmitting communications device of the other communications devices to the receiving communications device in a second subset of the time-divided slots and the frequency-divided regions of the resource pool during the first resource pool instance, the second subset being different to the first subset. Here, the time-divided slots and the frequency-divided regions of the first subset are a first function of the time-divided slots and the frequency-divided regions of the resource pool in which the one or more first previous signals were received during the second resource pool instance, and the time-divided slots and the frequency-divided regions of the second subset are a second function of the time-divided slots and the frequency-divided regions of the resource pool in which one or more second previous signals were received by the receiving communications device from the second transmitting communications device during the second resource pool instance. The first function is a first hopping function and the second function is a second hopping function, the first hopping function being different to the second hopping function. It should be appreciated here that the first and second hopping functions can each be either frequency-hopping or time-hopping functions, and work in the same manner as such functions described with respect to FIGS. 17 and 18 above. Here, the receiving communications device may be configured to monitor for the one or more second current signals in the second subset in response to detecting that the one or more first previous signals collided with the one or more second previous signals in the second resource pool instance, or alternatively the receiving communications device may be configured to perform the hopping function (s) and/or monitor for the one or more second current signals in the second subset for any other reason; such as avoiding any collisions that may occur, or increasing reception diversity. Operation according to this implementation of embodiments of the present technique is illustrated in FIG. 19 and described further below:

- A: Receiver UE, UE_C, monitors the whole resource pool, but there are no transmissions to the receiver UE;
- B: Both transmitter UEs, UE_A and UE_B, transmit using the same sidelink resources. This causes a collision at the receiver UE. The receiver UE can indicate that there is a collision (not shown). Example methods of determining that there is a collision on some sidelink resource are well known to those skilled in the art, and can include (1) the detection of energy on that resource without being able to decode PSCCH/PSSCH, (2) the detection of DMRS on that resource without being able to decode the PSCCH/PSSCH etc.;
- C: Understanding that there has been a collision, the receiver UE, UE_C monitors two resources within the resource pool;
- C: Transmitter UE, UE_A, uses a first hopping pattern (where it changes to transmission using a different PRB/sub-channel);
- C: Transmitter UE, UE_B, uses a second hopping pattern (where it does not change transmission resources);
- C: Receiver UE, UE_C, receives both the transmissions from UE_A and UE_B since they are transmitted in different resources;
- D: receiver UE, UE_C, monitors two sets of resources, since it was communicated with in the previous instance of the resource pool; and
- E,F: Since there was no communication in the previous instance of the resource pool, the receiver UE monitors the whole resource pool. In other words, if the receiving communications device does not receive any of the one or more first current signals in the first subset or second current signals in the second subset, the receiving communications device is configured to monitor a larger number of the time-divided slots of the resource pool than in the first subset and/or a larger number of the frequency-divided regions of the resource pool than in the first subset for one or more first next signals and/or second next signals during of a third of the resource pool instances, wherein the third resource pool instance is a subsequent resource pool instance to the first resource pool instance. Here, when monitoring this larger number of time-divided slots/frequency-divided regions, the receiving communications device may be configured to monitor the entire resource pool (i.e. all of the time-divided slots and all of the frequency-divided regions), or the receiving communications device may be configured to monitor a larger subset of the resource pool, where this larger subset comprises the first subset.

Figure 20:
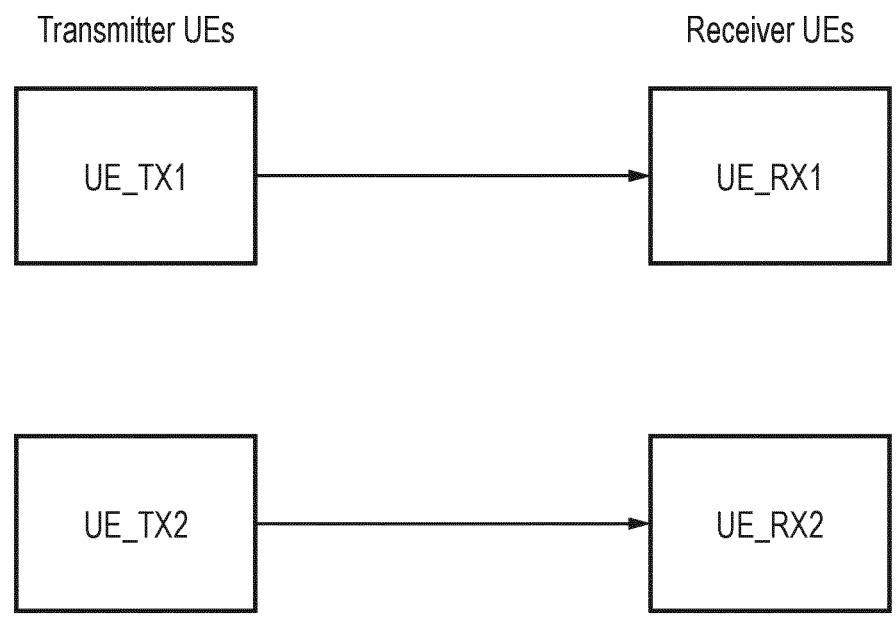
FIG. 20 shows a second arrangement of transmitting/receiving communications devices in accordance with at least some embodiments of the present technique

In some arrangements of embodiments of the present technique, a receiver UE may monitor a restricted set of resources when it has previously been communicated with and it hops the resources that it monitors according to a known pattern. The known patterns for different receiver UEs can be different. In such arrangements, repeated collision is avoided when a first transmitter UE, UE_TX1, communicates with a first receiver UE, UE_RX1, and a second transmitter UE, UE_TX2, communicates with a second receiver UE, UE_RX2. This scenario is illustrated in FIG. 20. In other words, in these arrangements, the function is a first function and is different to a second function, wherein the second function is used by a second receiving communications device of the other communications devices to determine a portion of the first resource pool in which to monitor for signals transmitted by a second transmitting communications device of the other communications devices. As previously described with reference to FIGS. 17, 18 and 19, the first and second functions can each be either frequency-hopping or time-hopping functions, and work in the same manner as such functions described with respect to FIGS. 17, 18 and 19 above.

Figure 21:
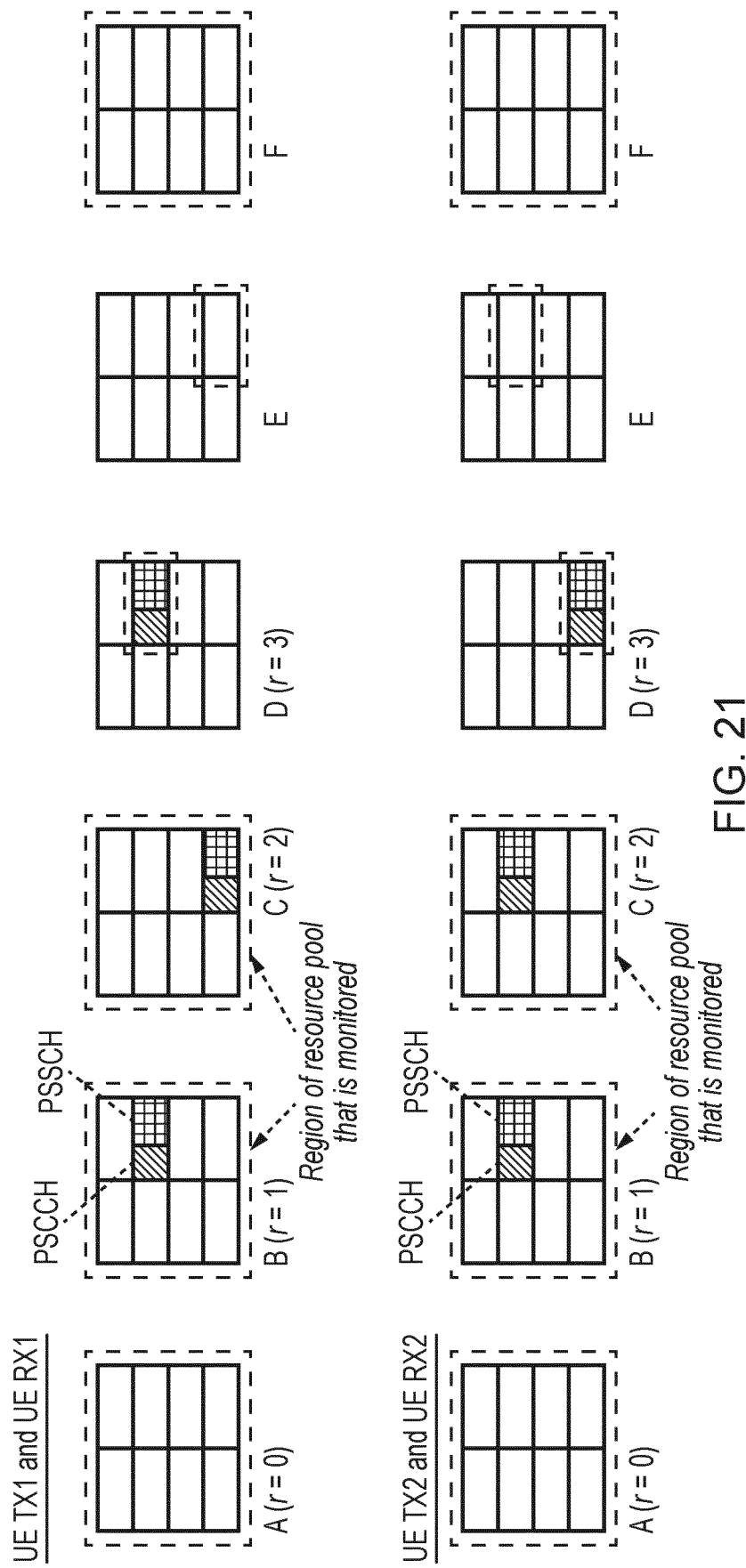
FIG. 21 shows how different receiver UEs may hop their monitored resources differently in accordance with embodiments of the present technique.

FIG. 21 illustrates operation of the UEs in accordance with such arrangements of embodiments of the present technique, and this is described in greater detail below:

- A: Receiver UEs, UE_RX1 and UE_RX2, monitor the whole resource pool, but there are no transmissions to the receiver UEs;
- B: Both transmitter UEs, UE_TX1 and UE_TX2, transmit using the same sidelink resources, even though these transmissions are destined for different receiver UEs. This causes a collision at the receiver UEs;
- C: UE_TX1 hops its transmission resources (it hops on odd-indexed resource pools).
  Note that if there had not been a collision, this transmission could be successfully received by UE_RX1 since UE_RX1 would be monitoring only PRB1 according to its hopping pattern;
- C: UE_TX2 does not hop its transmission resources (it hops instead on even-indexed resource pools);

Note that if there had not been a collision, this transmission could be successfully received by UE_RX2 since UE_RX2 would be monitoring only PRB3 according to its hopping pattern;

C: UE_RX1 suffered a collision so it did not receive a sidelink transmission from UE_TX1 in resource pool B. Hence it monitors the whole resource pool and receives a transmission from UE_TX1 in PRB1;

C: UE_RX2 suffered a collision so it did not receive a sidelink transmission from UE_TX2 in resource pool B. Hence it monitors the whole resource pool and receives a transmission from UE_TX2 in PRB3;

D: UE_RX1 monitors PRB3 according to its hopping pattern and UE_TX1 transmits to it using resources according the UE_RX1's known hopping pattern;

D: UE_RX2 monitors PRB1 according to its hopping pattern and UE_TX2 transmits to it using resources according the UE_RX2's known hopping pattern;

E: UE_RX1 monitors PRB1 according to its known hopping pattern, but there was no transmission to UE_RX1;

E: UE_RX2 monitors PRB3 according to its known hopping pattern, but there was no transmission to UE_RX2;

F: Since there was no transmission to UE_RX1 in the previous instance of the resource pool, it monitors the whole resource pool; and F: Since there was no transmission to UE_RX2 in the previous instance of the resource pool, it monitors the whole resource pool.

Monitoring Portion of Resource Pool for Specified Duration

In some arrangements of embodiments of the present technique, the receiver UE, UE_C, may monitor a restricted portion (e.g. the first subset) of the resource pool for the duration of a timer. In other words, the receiving communications device is configured to monitor for signals in the first subset for the duration of a timer, the timer being started upon reception of the one or more previous signals, and to monitor for signals in a larger number of the time-divided slots of the resource pool than in the first subset and/or a larger number of the frequency-divided regions of the resource pool than in the first subset upon expiry of the timer.

The timer can operate in one of two (or more) modes. For example, the timer may be a countdown timer (which may count down provided there is no activity, in an analogous way that an inactivity timer counts down when there is no traffic activity in DRX operation or another, but similar, inactivity timer). Here, the timer is re-started whenever there is activity. If the timer expires, then the UE moves to monitoring the full set of resources (or indeed the larger subset as described above) within the resource pool. It should be noted that when the inactivity timer for DRX operation expires, the UE goes to sleep rather than changing the amount of resource that it monitors. In other words, the timer is restarted upon reception of a signal in the first subset. The timer may alternatively be a basic timer, which again is started when there is activity. If the timer expires however, then the UE moves to monitoring the full set of resources within the resource pool. With this basic timer, only after the timer expiring and the receiver UE returning to monitoring the entire resource pool, does a detected received signal cause the receiver UE to again transition to monitoring the restricted set of resources of the resource pool and to restart the basic timer.

In some implementations of such arrangements of the present technique, the receiving communications device may be configured, following the end of duration of the countdown timer, to operate in accordance with a short cycle of restricted monitoring. The functionality of the short cycle of restricted monitoring may be understood by analogy with short DRX operation, where short DRX operation has been described previously (for example with reference to FIGS. 7 and 8). The receiver UE here would monitor a restricted set of resources for only some of the resource pool instances and would monitor the full set of resources for other resource pool instances in accordance with a short cycle of restricted monitoring. The pattern of the short cycle of restricted monitoring can be based on the pattern for short DRX operation, where the short cycle of restricted monitoring is based on the parameters of (1) number of short cycles, (2) duration of each short cycle in terms of the number of resource pool instances that it covers and (3) number of resource pool instances within each cycle in which restricted resources are monitored. In other words, the receiving communications device is configured here, following the end of duration of the timer, to operate in accordance with a short cycle of restricted monitoring, wherein the short cycle of restricted monitoring defines a pattern with which the receiving communications device should switch between monitoring the first subset during one or more resource pool instances and monitoring a larger number of the time-divided slots of the resource pool than in the first subset and/or a larger number of the frequency-divided regions of the resource pool than in the first subset during one or more other resource pool instances.

Figure 22:
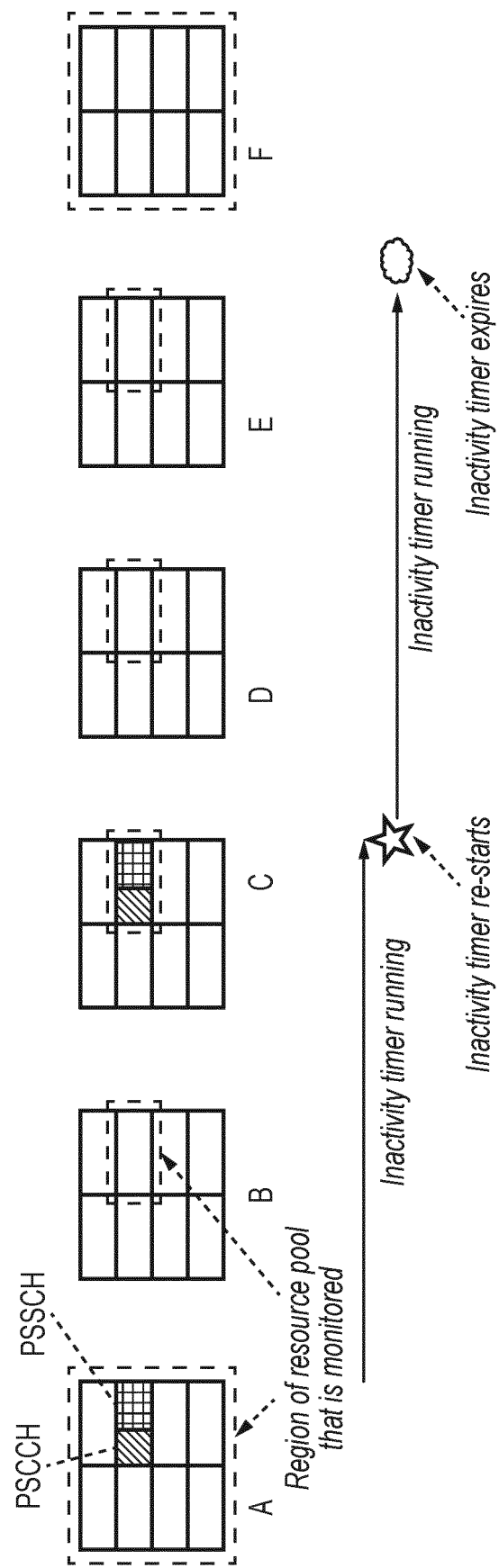
FIG. 22 illustrates an example of how a UE may monitor a restricted set of resources of a resource pool during the running of a timer in accordance with embodiments of the present technique.

Operation of the embodiment of the invention where the UE monitors a restricted portion of the resource pool according to a countdown timer is illustrated in FIG. 22 and is described below:

A: UE monitors the whole resource pool and is allocated PSCCH/PSSCH in slot 2 and PRB 3. Based on this activity, the UE starts an inactivity/countdown timer. The inactivity/countdown timer duration can be configured (e.g. via RRC). In this figure, the inactivity/countdown timer duration is the length of two resource pools. It should be appreciated by those skilled in the art that the UE could equally start a basic timer here, but operation would not be the same as that which is illustrated by FIG. 22;

B: Since the inactivity/countdown timer is running, the UE monitors the resource pool in slot 2 and PRB 3. There is no allocation to the UE;

C: Since the inactivity/countdown timer is running, the UE monitors the resource pool in slot 2 and PRB 3. There is an allocation of PSCCH/PSSCH to the UE, hence the inactivity/countdown timer is re-started. It would be appreciated that here, if the UE had started a basic timer, this timer would not restart here and the UE would continue monitoring the restricted set of resources anyway until this timer expired, before returning to monitor the entire resource pool as it did during resource pool instance A;

D: Since the inactivity/countdown timer is running, the UE monitors the resource pool in slot 2 and PRB 3. There is no allocation to the UE;

E: Since the inactivity/countdown timer is running, the UE monitors the resource pool in slot 2 and PRB 3. There is no allocation to the UE. The inactivity/countdown timer expires since there has been no allocation to the UE for the duration of the inactivity/countdown timer; and F: Since the inactivity/countdown timer is not running, the UE monitors the full resource pool.

Monitoring Full Resource Pool after Activity

In the arrangements of embodiments of the present technique as described above, a receiving UE monitors a restricted set of resources after there has been activity in those restricted set of resources during a time the receiving UE had been monitoring the entire resource pool. However, in other arrangements of embodiments of the present technique, the receiving UE may operate in a similar but opposite manner, where it may be configured to:

Monitor a restricted set of resources within a resource pool when there has not been activity on the link; and Monitor the full set of resources within a resource pool when there has been activity on the link (in the restricted set of resources as this is all the UE has been monitoring).

In other words, in such arrangements of embodiments of the present technique, the receiving communications device is configured to monitor for signals transmitted by one or more transmitting communications devices of the other communications devices to the receiving communications device in a subset of the time-divided slots and the frequency-divided regions of the resource pool during a first of the resource pool instances, to receive one or more signals in the subset during the first resource pool instance, and to monitor for signals in a larger number of the time-divided slots of the resource pool than in the subset and/or a larger number of the frequency-divided regions of the resource pool than in the subset during a second of the resource pool instances in response to receiving the one or more signals in the subset during the first resource pool instance. Here, when monitoring this larger number of time-divided slots/frequency-divided regions, the receiving communications device may be configured to monitor the entire resource pool (i.e. all of the time-divided slots and all of the frequency-divided regions), or the receiving communications device may be configured to monitor a larger subset of the resource pool, where this larger subset comprises the subset.

Figure 23:
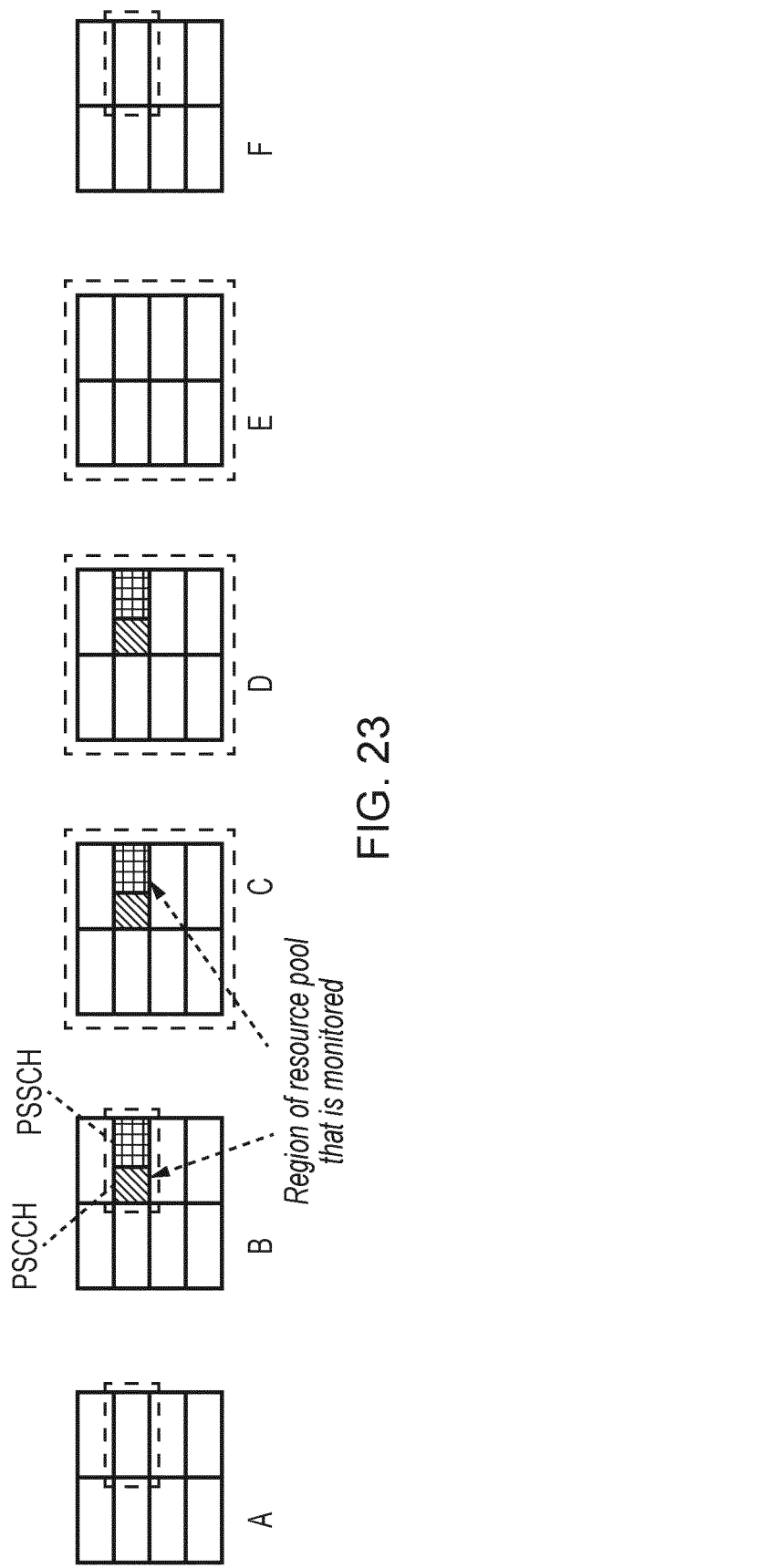
FIG. 23 illustrates an example of how a UE may monitor an entire resource pool after it has been communicated to within a restricted region of the resource pool in accordance with embodiments of the present technique.

Such arrangements of embodiments of the present technique allow the receiver UE to save power when it is not communicating with a transmitter UE as it does not have to monitor the entire resource pool, and allows for a wider choice of communications resources when the receiving UE is communicating with a transmitter UE. The use a wide choice of communications resources can reduce blocking. Operation according to such arrangements is illustrated by FIG. 23, and is described below:

A: UE monitors slot 2/PRB 3 within the resource pool since there has previously been no activity on the link. The UE does not detect PSCCH for the UE on the restricted resources;

B: UE monitors slot 2/PRB 3 within the resource pool and receives an allocation (PSCCH and PSSCH) from a transmitting UE (i.e. the UE detects PSCCH for the UE on the restricted resources). It should be noted here that the transmitting UE either knows that this particular receiving UE is monitoring these resources (i.e. the resources in slot 2/PRB 3) or transmits in multiple resources in the case that it doesn't know which resource the receiving UE is listening to;

C: Given that the UE had received an allocation in the previous instance of the resource pool, the receiving UE monitors the whole resource pool. The receiving UE receives an allocation;

D: Given that the UE had received an allocation in the previous instance of the resource pool, the receiving UE monitors the whole resource pool. The receiving UE receives an allocation;

E: Given that the UE had received an allocation in the previous instance of the resource pool, the receiving UE monitors the whole resource pool. The receiving UE does not receive an allocation; and F: Since the UE did not receive an allocation in the previous instance of the resource pool, it monitors for PSCCH/PSSCH in the restricted resources of slot 2/PRB 3.

For the arrangement illustrated by FIG. 23, the inactivity/countdown timer can be used to move from the restricted monitoring mode to the full monitoring mode. In other words, the receiving communications device may be configured to monitor for the signals in the larger number of the time-divided slots and/or the larger number of the frequency-divided regions for the duration of a timer, the timer being started upon reception of the one or more signals in the subset during the first resource pool instance, and, if the timer expires, to monitor for future signals in the subset during future resource pool instances after expiry of the timer. For example, the UE changes to the full monitoring mode in resource pool instance C, and then the UE starts the inactivity/countdown timer from resource pool instance C. In resource pool instance D, since the UE detects the PSCCH for the UE again, the UE restarts the inactivity/countdown timer. After the inactivity/countdown timer expires in resource pool instance F, the UE can move from the full monitoring mode to the restricted monitoring mode. Here, the receiving communications device may be configured to monitor for the signals in the subset during the first resource pool instance when the receiving communications device is operating in accordance with a reduced power mode of operation, where this reduced power mode of operation is analogous to (and in some implementations, may actually be) DRX_OFF phases of a DRX cycle, which has been described in further detail above.

Here, the transmitting communications device may be configured—now that it has transmitted to the receiving communications device in the subset and is thus aware that the receiving communications device is monitoring the whole resource pool (or at least, a larger subset of the resource pool)—to utilise the receiving communications device's broader monitoring by transmitting one or more next signals to the receiving communications device, during the second resource pool instance, in one or more of the time-divided slots of the resource pool that are outside of the subset and one or more of the frequency-divided regions of the resource pool that are outside of the subset.

It should be noted that in these arrangements of embodiments of the present technique, the transmitter UE does not necessarily know which resources the receiving UE is monitoring. There are various solutions to this problem, described below, but those skilled in the art would appreciate that such solutions described below are not intended to be limiting in any way.

Firstly, receiving UEs may default to monitoring a known restricted set of resources when they are not actively in communication with another UE. The known restricted set of resources acts as a "listening channel". When communication with a receiver UE has been initiated on the listening channel, the UEs can move to operating with less restricted resources. In other words, the subset is predetermined and known to each of the receiving communications device and the one or more transmitting communications devices. The known restricted set of resources could be either signalled by RRC signalling, provisioned in SIM cards or be known in the specifications.

Secondly, the restricted resources that a UE monitors may be known a-priori to a transmitting UE. For example, a receiving UE that is "paired" with a transmitter UE can use a known restricted set of resources.

Thirdly, certain classes of receiving UE could monitor known restricted sets of resources. For example, pedestrian UEs could use a known set of restricted resources (vehicular UEs could use a larger set of restricted resources, since vehicular UEs may not be as power conscious as pedestrian UEs). If a vehicular UE wishes to transmit to a pedestrian UE, then it would use that known set of restricted resources. In other words, the subset is associated with a class of the receiving communications device.

Fourthly, a transmitter UE may transmit in multiple resources, e.g. it transmits in all the potential resources that a receiver UE could be monitoring. Such a solution may not be ideal for pedestrian UEs as such transmissions would not be good for power consumption, but this may not be a problem for vehicular UEs. Additionally, such a solution is good when the transmitting UE has no knowledge of the receiving UE's restricted set of resources, as it can get through to the receiving UE by transmitting on all resources the receiving UE may be monitoring. Such a solution is preferable for when power consumption is a greater concern to the receiving UE than it is to the transmitting UE.

Multiple Devices Transmitting to Single Receiving Device

It is possible that while one transmitter UE, UE_A, is communicating with a receiver UE, UE_C, another transmitter UE, UE_B, also wants to communicate with the receiver UE, UE_C. In this case, when there is an ongoing communication stream between UE_A and UE_C, that other UE, UE_B, must monitor which resources within resource pools are being used by the other transmitter UE, UE_A. Once the potential transmitter UE, UE_B, knows which resources a receiver UE, UE_C, is monitoring, it can itself transmit using those resources. In other words, the transmitting communications device is configured to determine that the receiving communications device is monitoring the first subset for one or more signals from the second transmitting communications device, and to transmit the one or more first current signals to the receiving communications devices in the first subset.

The transmitting communications device may be configured to determine that the receiving communications device is monitoring the first subset for the one or more signals from the second transmitting communications device by detecting that the second transmitting communications device had transmitted the one or more first previous signals to the receiving communications device. Alternatively, or in addition, the transmitting communications device may be configured to determine that the receiving communications device is monitoring the first subset for the one or more signals from the second transmitting communications device by detecting control signalling exchanged between the receiving communications device and the second transmitting communications device, wherein the control signalling comprises an indication that the receiving communications device is monitoring the first subset for the one or more signals from the second transmitting communications device.

The transmitting communications device may be configured to determine, based on a predefined rule known by each of the transmitting communications device, the second transmitting communications device and the receiving communications device, that the second transmitting communications device will transmit one or more future signals in the same time-divided slots and/or frequency-divided regions of the resources pool as the one or more first previous signals.

Here, the transmitting communications device may then be configured to transmit, dependent on the predefined rule, the one or more first current signals to the receiving communications devices in a portion of the time-divided slots and/or a portion of the frequency-divided regions of the first subset that does not overlap with a portion of the time-divided slots and/or a portion of the frequency-divided regions of the first subset in which the second transmitting communications device transmitted the one or more first previous signals to the receiving communications device.

Figure 24:
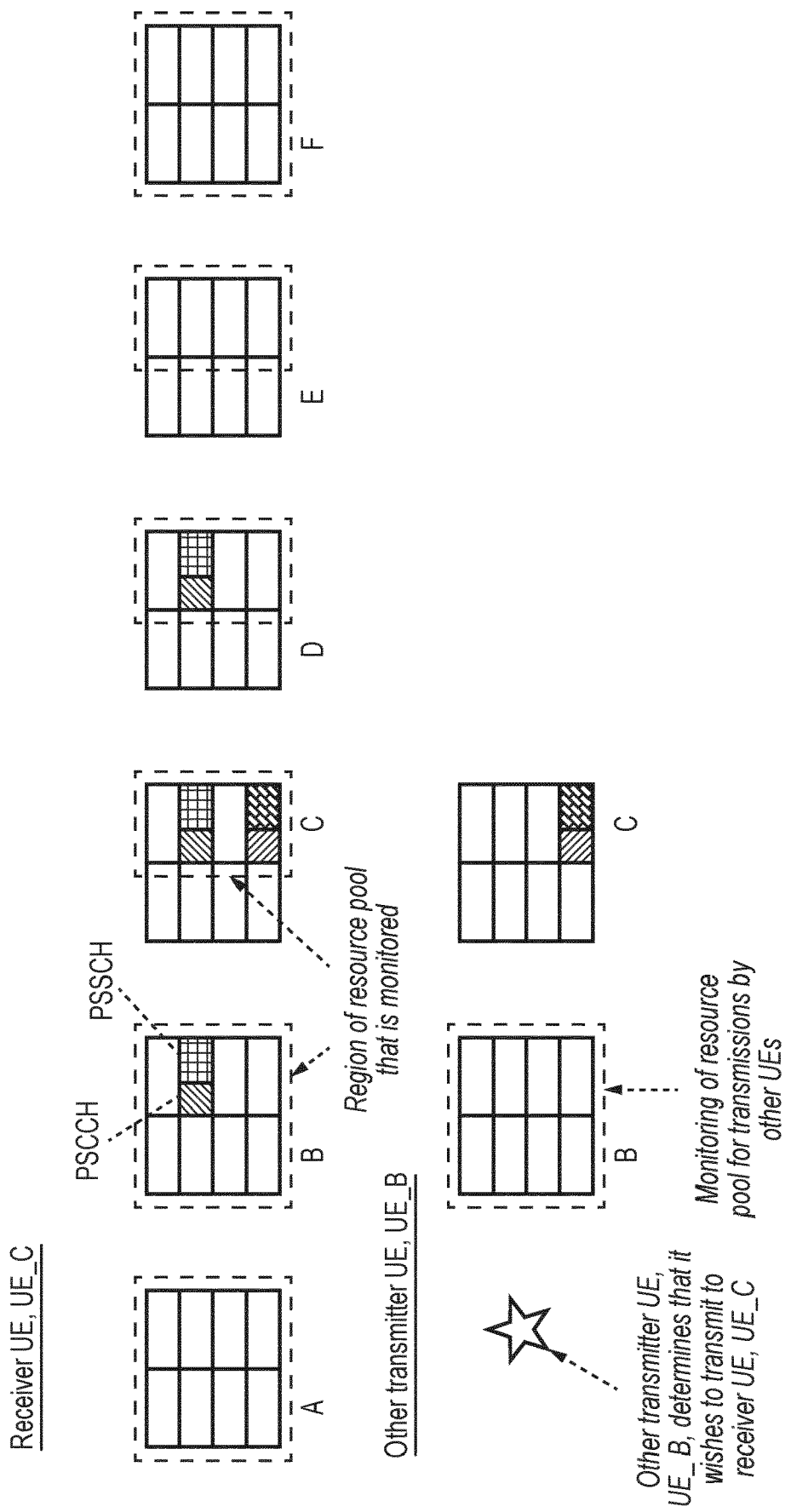
FIG. 24 shows how a transmitter UE may monitor transmissions to an intended receiver UE from another transmitter UE before transmitting itself in accordance with embodiments of the present technique.

FIG. 24 shows operation according to such an arrangement of embodiments of the present technique.

FIG. 24 (which is based on the example of FIG. 15 as described above) shows the following functionality in different instances of the resource pool:

A: receiver UE, UE_C, monitors the entire resource pool since there has not been prior communication to UE_C;
A: transmitter UE, UE_B, determines that it has data to send to the receiver UE, UE_C;
B: another UE, UE_A, transmits PSCCH/PSSCH to the receiver UE, UE_C, in slot 2 of the resource pool;
B: UE_B monitors the resource pool and determines that the receiver UE, UE_C, has been communicated with using the second slot of the resource pool. Hence this UE, UE_B, determines that it must transmit its data in the second slot in the next instance of the resource pool as this is the portion of the resource pool that UE_C will now be monitoring having received the PSCCH/PSSCH from UE_A;
C: UE_B uses resources in the second slot to transmit to the receiver UE, UE_C. It can choose resources such that they do not collide with other resources that are being transmitted to the receiver UE, UE_C;
C: receiver UE, UE_C, receives two sidelink communications (from the two transmitting UEs, UE_A and UE_B) in the second slot of the resource pool;
D: UE_B stops transmitting to the receiver UE, UE_C (e.g. due to there being no more data to transmit); and
D: Functionality of receiver UE, UE_C, continues as per the example of FIG. 15 as described above.

Occasionally Monitoring Entire Resource Pool

Above-described arrangements of embodiments of the present technique have described cases where the receiving UE sometimes monitors a restricted set of resources within a resource pool. As long as a communicating pair of UEs each know what this restricted set of resources is, the communication can proceed. Alternatively if a third UE (UE_B) is able to determine the restricted resources being used between two other UEs (UE_A and UE_C), that other UE (UE_B) can also communicate with UE_C (e.g. as described above with reference to FIG. 24).

In another arrangement of embodiments of the present technique, the receiver UE can monitor the whole resource pool at known times (e.g. for known instances of the resource pool). At other times, the UE can monitor a restricted set of resources as per other arrangements of the present technique as described above. For example, the UE can be configured to monitor the whole resource pool every $4^{th}$ instance of the resource pool and to monitor a restricted set of resources in other instances of the resource pool if the UE was previously communicated with using that restricted set of resources. In other words, the receiving communications device is configured (e.g. before—or during—monitoring for the first current signals in the first subset during the first and later resource pool instances) to monitor, during particular ones of the resource pool instances in accordance with a predefined pattern, a larger number of the time-divided slots of the resource pool than in the subset and/or a larger number of the frequency-divided regions of the resource pool than in the subset, wherein the second resource pool instance is one of the particular resource pool instances, and to monitor, during the other resource pool instances to the particular resource pool instances in accordance with the predefined pattern, either the subset or none of the time-divided slots and none of frequency-divided regions of the resource pool. Here, when monitoring this larger number of time-divided slots/frequency-divided regions, the receiving communications device may be configured to monitor the entire resource pool (i.e. all of the time-divided slots and all of the frequency-divided regions), or the receiving communications device may be configured to monitor a larger subset of the resource pool, where this larger subset comprises the first subset.

Here, the monitoring of either the particular ones of the resource pool instances or the others of the resource pool instances (i.e. the predefined pattern) may be based on (and determined by the communications device based on) a long cycle of restricted monitoring. The functionality of the long cycle of restricted monitoring may be understood by analogy with long DRX operation, where long DRX operation has been described previously (for example with reference to FIGS. 4 to 8). Furthermore, whether the communications device monitors none of the resources or the first subset of resources during the others of the resource pool instances may be based on an inactivity timer or countdown timer as has been previously described; for example, if the timer has not yet expired, the communications device monitors the first subset of resources during the others of the resource pool instances, but if the timer has expired, the communications device doesn't monitor any of the resources of the resource pool during the others of the resource pool instances.

Figure 25:
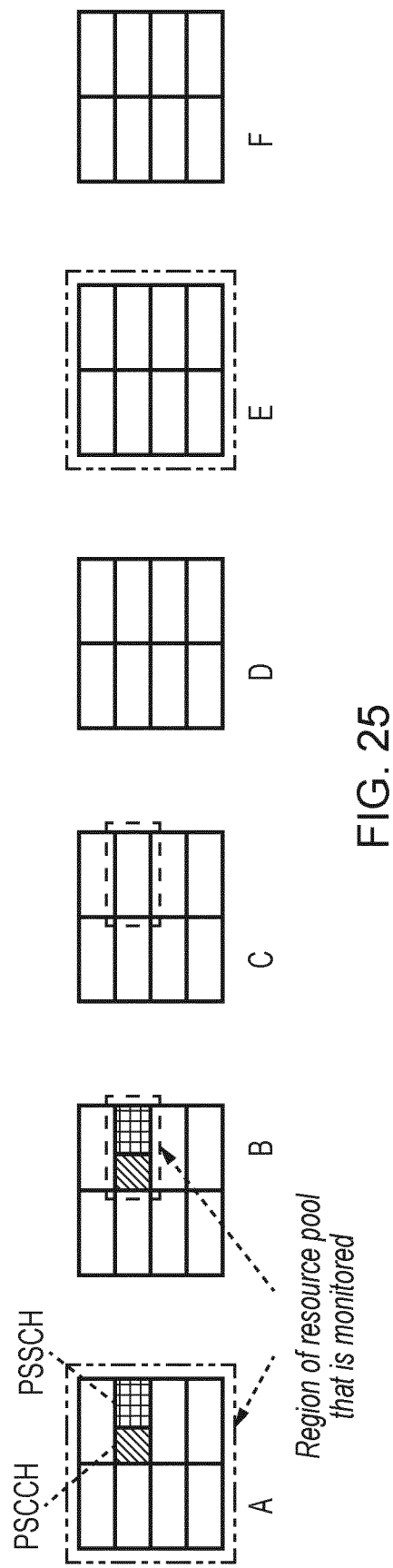
FIG. 25 illustrates how a UE may be configured to monitor the whole resource pool occasionally in accordance with embodiments of the present technique.

Operation according to this arrangement of the invention is illustrated in FIG. 25 and described below:

A: UE is configured to monitor all the resources in this resource pool instance and receives an allocation of PSCCH/PSSCH;

B: UE monitors a restricted set of resources based on those resources on which it was previously allocated (i.e. using the resources of slot 2/PRB 3). The UE is allocated with PSCCH/PSSCH in this resource pool. In addition, the UE may start the inactivity/countdown timer;

C: UE monitors a restricted set of resources based on those resources on which it was previously allocated (i.e. using the resources of slot 2/PRB 3). The UE is not allocated with PSCCH/PSSCH in this resource pool instance;

D: Since the UE was not allocated with PSCCH/PSSCH in the previous instance of the resource pool, it sleeps during instance D of the resource pool. Furthermore, if the UE uses the inactivity/countdown timer and the timer expires, the UE sleeps during instance D;

E: Since E is the fourth instance of the resource pool and according to the rule that the UE monitors the full resources of the resource pool, the UE monitors all of the resources of the resource pool in instance E; and F: Since the UE was not allocated in instance E, the UE does not monitor any resources in instance F of the resource pool. The next instance of the resource pool that the UE will monitor will be the eighth instance.

This long cycle of restricted monitoring described above with reference to FIG. 25 and the short cycle of restricted monitoring described above with reference to FIG. 22 may therefore be understood to be similar modes of operation. The primary difference is that the long cycle of restricted monitoring (which can be considered to be analogous to the long DRX cycle or may indeed be the long DRX cycle in some implementations) has a slower rate of switching than the short cycle of restricted monitoring (which can be considered to be analogous to the short DRX cycle or may indeed be the short DRX cycle in some implementations).

Monitoring Multiple Restricted Sets of Resources

Above-described arrangements of embodiments of the present technique have described cases where a receiving UE monitors a single set of restricted resources after it has been previously been communicated with in those resources. The use of a single set of restricted resources can lead to a scheduling flexibility issue. Hence in some arrangements of embodiments of the present technique, when the UE has been communicated with in a previous instance of the resource pool, in a subsequent instance of the resource pool, the UE monitors more than one set of restricted resources in a subsequent instance of the resource pool. In other words, the receiving communications device is configured to monitor for the one or more first current signals in each of a plurality of subsets of the time-divided slots and the frequency-divided regions of the resource pool during the first resource pool instance, wherein the first subset is one of the plurality of subsets.

Flow Diagram Representation

Figure 26:
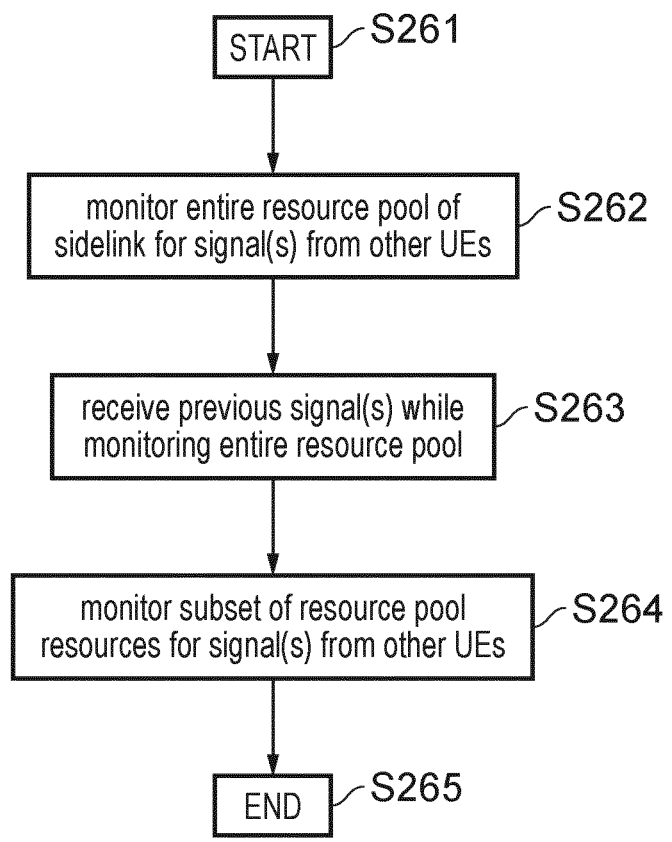
FIG. 26 is a flow diagram representation of a first method of operating a communications device according to at least some embodiments of the present technique.

FIG. 26 shows a flow diagram illustrating a first method of operating a communications device according to at least some embodiments of the present technique. The communications device is a receiving communications device.

The method begins in step S261. The method comprises, in step S262, receiving (or monitoring for) signals from one or more of a plurality of other communications devices within sidelink communications resources of a plurality of instances of a resource pool of a sidelink interface, the resource pool being formed of a plurality of time-divided slots and a plurality of frequency-divided regions. Here, a larger number of the time-divided slots of the resource pool than in the subset and/or a larger number of the frequency-divided regions of the resource pool than in the subset are monitored by the receiving communications device. This larger number of the time-divided slots/frequency-dived regions may be the entire resource pool (i.e. all of the time-divided slots and all of frequency-divided regions of the resource pool), or may be a larger subset of the resource pool, where this larger subset comprises the first subset. In step S263, the method comprises receiving one or more previous signals from a transmitting communications device during a second of the resource pool instances during which the receiving communications device is monitoring the entire resource pool. In step S264, the process comprises monitoring for one or more first current signals transmitted by at least a first transmitting communications device of the other communications devices to the receiving communications device in a first subset of the time-divided slots and the frequency-divided regions of the resource pool during a first of the resource pool instances. Here, the second resource pool instance is a preceding resource pool instance relative to the first resource pool instance. The first subset is dependent on which of the time-divided slots and the frequency-divided regions of the resource pool in which the one or more first previous signals were received by the receiving communications device while it was monitoring the entire resource pool. The process ends in step S265.

Figure 27:
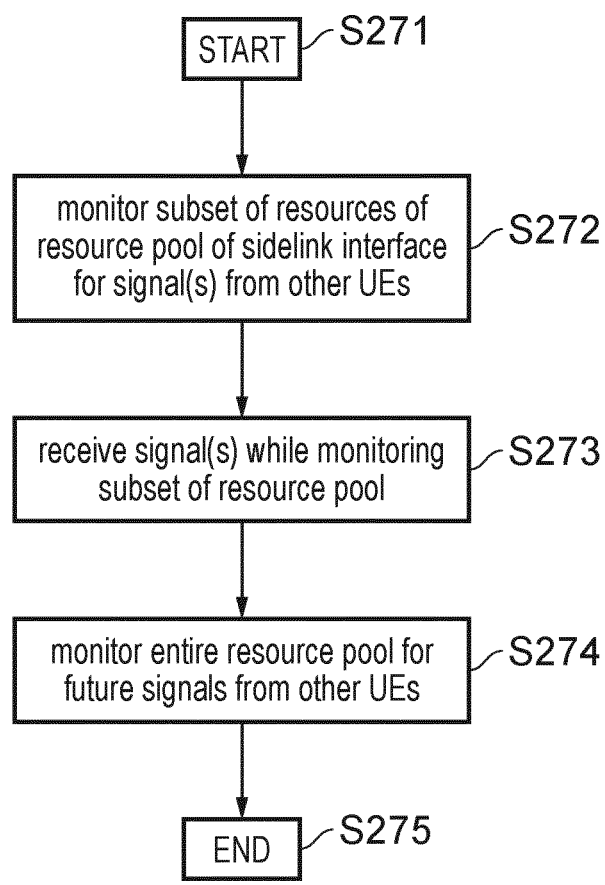
FIG. 27 is a flow diagram representation of a second method of operating a communications device according to at least some embodiments of the present technique.

FIG. 27 shows a flow diagram illustrating a second method of operating a communications device according to at least some embodiments of the present technique. The communications device is a receiving communications device.

The method begins in step S271. The method comprises, in step S272, receiving (or monitoring for) signals from one or more of a plurality of other communications devices within sidelink communications resources of a plurality of instances of a resource pool of a sidelink interface, the resource pool being formed of a plurality of time-divided slots and a plurality of frequency-divided regions. Here, the receiving communications device monitors for such signals transmitted by one or more transmitting communications devices of the other communications devices to the receiving communications device in a subset of the time-divided slots and the frequency-divided regions of the resource pool during a first of the resource pool instances. In step S273, the method comprises receiving one or more signals in the subset during the first resource pool instance. In step S274, the process comprises monitoring for signals in a larger number of the time-divided slots of the resource pool than in the subset and/or a larger number of the frequency-divided regions of the resource pool than in the subset during a second of the resource pool instances in response to receiving the one or more signals in the subset during the first resource pool instance. The process ends in step S275.

Those skilled in the art would appreciate that the methods shown by FIGS. 26 and 27 may be adapted in accordance with embodiments of the present technique. For example, other intermediate steps may be included in either or both of the methods, or the steps may be performed in any logical order. Though embodiments of the present technique have been described largely by way of the example communications system shown in FIG. 11, and in accordance with the arrangements shown in FIGS. 12 to 25, it would be clear to those skilled in the art that they could be equally applied to other systems to those described herein Those skilled in the art would further appreciate that such infrastructure equipment and/or communications devices as herein defined may be further defined in accordance with the various arrangements and embodiments discussed in the preceding paragraphs. It would be further appreciated by those skilled in the art that such infrastructure equipment and communications devices as herein defined and described may form part of communications systems other than those defined by the present disclosure.

The following numbered paragraphs provide further example aspects and features of the present technique:

Paragraph 1. A receiving communications device comprising
- a receiver configured to receive signals from one or more of a plurality of other communications devices within sidelink communications resources of a plurality of instances of a resource pool of a sidelink interface, the resource pool being formed of a plurality of time-divided slots and a plurality of frequency-divided regions, and
- a controller configured in combination with the receiver to monitor for one or more first current signals transmitted by at least a first transmitting communications device of the other communications devices to the receiving communications device in a first subset of the time-divided slots and the frequency-divided regions of the resource pool during a first of the resource pool instances,
- wherein the first subset is dependent on which of the time-divided slots and the frequency-divided regions of the resource pool in which one or more first previous signals were received by the receiving communications device from the first transmitting communications device during a second of the resource pool instances during which the receiving communications device is configured to monitor a larger number of the time-divided slots of the resource pool than in the first subset and/or a larger number of the frequency-divided regions of the resource pool than in the first subset, wherein the second resource pool instance is a preceding resource pool instance to the first resource pool instance.

Paragraph 2. A receiving communications device according to Paragraph 1, wherein the time-divided slots and the frequency-divided regions of the first subset are the same as the time-divided slots and the frequency-divided regions of the resource pool in which the one or more first previous signals were received during the second resource pool instance.

Paragraph 3. A receiving communications device according to Paragraph 1 or Paragraph 2, wherein if the receiving communications device does not receive any of the one or more first current signals in the first subset during the first resource pool instance, the controller is configured in combination with the receiver
- to monitor a larger number of the time-divided slots of the resource pool than in the first subset and/or a larger number of frequency-divided regions of the resource pool than in the first subset for one or more first next signals during a third of the resource pool instances, wherein the third resource pool instance is a subsequent resource pool instance to the first resource pool instance.

Paragraph 4. A receiving communications device according to any of Paragraphs 1 to 3, wherein the first subset comprises all of the plurality of time-divided slots of the resource pool and only the frequency-divided regions of the resource pool in which the one or more first previous signals were received during the second resource pool instance.

Paragraph 5. A receiving communications device according to any of Paragraphs 1 to 4, wherein the first subset comprises all of the plurality of frequency-divided regions of the resource pool and only the time-divided slots of the resource pool in which the one or more first previous signals were received during the second resource pool instance.

Paragraph 6. A receiving communications device according to any of Paragraphs 1 to 5, wherein the time-divided slots and the frequency-divided regions of the first subset are a function of the time-divided slots and the frequency-divided regions of the resource pool in which the one or more first previous signals were received during the second resource pool instance.

Paragraph 7. A receiving communications device according to Paragraph 6, wherein the function is a frequency hopping function, wherein the time-divided slots of the first subset are the same as the time-divided slots in which the one or more first previous signals were received, and wherein the frequency-divided regions of the first subset are the same as a number of the frequency-divided regions of the resource pool in which the one or more first previous signals were received during the second resource pool instance and the frequency-divided regions of the first subset are shifted in frequency by one or more frequency-divided regions, with respect to the frequency-divided regions of the resource pool in which the one or more first previous signals were received during the second resource pool instance, in accordance with the frequency hopping function.

Paragraph 8. A receiving communications device according to Paragraph 6 or Paragraph 7, wherein the function is a time hopping function, wherein the frequency-divided regions of the first subset are the same as the frequency-divided regions in which the one or more first previous signals were received, and wherein a number of the time-divided slots of the first subset is the same as a number of the time-divided slots of the resource pool in which the one or more first previous signals were received during the second resource pool instance and the time-divided slots of the first subset are shifted in time by one or more time-divided slots, with respect to the time-divided slots of the resource pool in which the one or more first previous signals were received during the second resource pool instance, in accordance with the time hopping function.

Paragraph 9. A receiving communications device according to any of Paragraphs 6 to 8, wherein the function is a first function and is different to a second function, wherein the second function is used by a second receiving communications device of the other communications devices to determine a portion of the first resource pool in which to monitor for signals transmitted by a second transmitting communications device of the other communications devices.

Paragraph 10. A receiving communications device according to any of Paragraphs 1 to 9, wherein the controller circuitry is configured in combination with the receiver circuitry
- to monitor for one or more second current signals transmitted by a second transmitting communications device of the other communications devices to the receiving communications device in a second subset of the time-divided slots and the frequency-divided regions of the resource pool during the first resource pool instance, the second subset being different to the first subset,
- wherein the time-divided slots and the frequency-divided regions of the first subset are a first function of the time-divided slots and the frequency-divided regions of the resource pool in which the one or more first previous signals were received during the second resource pool instance, and
- wherein the time-divided slots and the frequency-divided regions of the second subset are a second function of the time-divided slots and the frequency-divided regions of the resource pool in which one or more second previous signals were received by the receiving communications device from the second transmitting communications device during the second resource pool instance.

Paragraph 11. A receiving communications device according to Paragraph 10, wherein the controller circuitry is configured in combination with the receiver circuitry to monitor for the one or more second current signals in the second subset in response to detecting that the one or more first previous signals collided with the one or more second previous signals in the second resource pool instance.

Paragraph 12. A receiving communications device according to Paragraph 10 or Paragraph 11, wherein the first function is a first hopping function and the second function is a second hopping function, the first hopping function being different to the second hopping function.

Paragraph 13. A receiving communications device according to any of Paragraphs 10 to 12, wherein if the receiving communications device does not receive any of the one or more first current signals in the first subset or second current signals in the second subset, the controller is configured in combination with the receiver
- to monitor a larger number of the time-divided slots of the resource pool than in the first subset and a larger number of the frequency-divided regions of the resource pool than in the first subset for one or more first next signals and/or second next signals during of a third of the resource pool instances, wherein the third resource pool instance is a subsequent resource pool instance to the first resource pool instance.

Paragraph 14. A receiving communications device according to any of Paragraphs 1 to 13, wherein the controller circuitry is configured in combination with the receiver circuitry
- to monitor for signals in the first subset for the duration of a timer, the timer being started upon reception of the one or more previous signals, and
- to monitor for signals in a larger number of the time-divided slots of the resource pool than in the first subset and/or a larger number of the frequency-divided regions of the resource pool than in the first subset upon expiry of the timer.

Paragraph 15. A receiving communications device according to Paragraph 14, wherein the timer is restarted upon reception of a signal in the first subset.

Paragraph 16. A receiving communications device according to Paragraph 14 or Paragraph 15, wherein the controller is configured in combination with the receiver, following the end of duration of the timer,
- to operate in accordance with a short cycle of restricted monitoring, wherein the short cycle of restricted monitoring defines a pattern with which the receiving communications device should switch between monitoring the first subset during one or more resource pool instances and monitoring a larger number of the time-divided slots of the resource pool than in the first subset and/or a larger number of the frequency-divided regions of the resource pool than in the first subset during one or more other resource pool instances.

Paragraph 17. A receiving communications device according to any of Paragraphs 1 to 16, wherein the controller is configured in combination with the receiver
- to monitor, during particular ones of the resource pool instances in accordance with a predefined pattern, a larger number of the time-divided slots of the resource pool than in the first subset and/or a larger number of the frequency-divided regions of the resource pool than in the first subset, wherein the second resource pool instance is one of the particular resource pool instances, and
- to monitor, during the other resource pool instances to the particular resource pool instances, either the first subset or none of the time-divided slots and none of the frequency-divided regions of the resource pool.

Paragraph 18. A receiving communications device according to Paragraph 17, wherein the predefined pattern is defined by a long cycle of restricted monitoring.

Paragraph 19. A receiving communications device according to Paragraph 17 or Paragraph 18, where the receiving communications device is configured to determine that is should monitor either the first subset or none of the time-divided slots and none of the frequency-divided regions of the resource pool based on a timer.

Paragraph 20. A receiving communications device according to any of Paragraphs 1 to 19, wherein the controller is configured in combination with the receiver
to monitor for the one or more first current signals in each of a plurality of subsets of the time-divided slots and the frequency-divided regions of the resource pool during the first resource pool instance, wherein the first subset is one of the plurality of subsets.

Paragraph 21. A method of operating a receiving communications device, the method comprising
receiving signals from one or more of a plurality of other communications devices within sidelink communications resources of a plurality of instances of a resource pool of a sidelink interface, the resource pool being formed of a plurality of time-divided slots and a plurality of frequency-divided regions, and
monitoring for one or more first current signals transmitted by at least a first transmitting communications device of the other communications devices to the receiving communications device in a first subset of the time-divided slots and the frequency-divided regions of the resource pool during a first of the resource pool instances,
wherein the first subset is dependent on which of the time-divided slots and the frequency-divided regions of the resource pool in which one or more first previous signals were received by the receiving communications device from the first transmitting communications device during a second of the resource pool instances during which the receiving communications device is configured to monitor a larger number of the time-divided slots of the resource pool than in the first subset and/or a larger number of the frequency-divided regions of the resource pool than in the first subset, wherein the second resource pool instance is a preceding resource pool instance to the first resource pool instance.

Paragraph 22. Circuitry for a receiving communications device comprising
receiver circuitry configured to receive signals from one or more of a plurality of other communications devices within sidelink communications resources of a plurality of instances of a resource pool of a sidelink interface, the resource pool being formed of a plurality of time-divided slots and a plurality of frequency-divided regions, and
controller circuitry configured in combination with the receiver circuitry
to monitor for one or more first current signals transmitted by at least a first transmitting communications device of the other communications devices to the receiver circuitry in a first subset of the time-divided slots and the frequency-divided regions of the resource pool during a first of the resource pool instances,
wherein the first subset is dependent on which of the time-divided slots and the frequency-divided regions of the resource pool in which one or more first previous signals were received by the receiver circuitry from the first transmitting communications device during a second of the resource pool instances during which the receiver circuitry is configured to monitor a larger number of the time-divided slots of the resource pool than in the first subset and/or a larger number of the frequency-divided regions of the resource pool than in the first subset, wherein the second resource pool instance is a preceding resource pool instance to the first resource pool instance.

Paragraph 23. A transmitting communications device comprising
a transmitter configured to transmit signals to a receiving communications device of a plurality of other communications devices within sidelink communications resources of a plurality of instances of a resource pool of a sidelink interface, the resource pool being formed of a plurality of time-divided slots and a plurality of frequency-divided regions, and
a controller configured in combination with the transmitter
to determine that the receiving communications device is only monitoring a first subset of the time-divided slots and the frequency-divided regions of the resource pool during a first of the resource pool instances, and
to transmit one or more first current signals to the receiving communications device in the first subset during the first resource pool instance,
wherein the first subset is dependent on which of the time-divided slots and the frequency-divided regions of the resource pool in which either the transmitting communications device or a second transmitting communications device of the other communications devices had transmitted one or more first previous signals to the receiving communications device during a second of the resource pool instances during which the receiving communications device had monitored a larger number of the time-divided slots of the resource pool than in the first subset and/or a larger number of the frequency-divided regions of the resource pool than in the first subset, wherein the second resource pool instance is a preceding resource pool instance to the first resource pool instance.

Paragraph 24. A transmitting communications device according to Paragraph 23, wherein the time-divided slots and the frequency-divided regions of the first subset are the same as the time-divided slots and the frequency-divided regions of the resource pool in which the one or more first previous signals were transmitted during the second resource pool instance.

Paragraph 25. A transmitting communications device according to Paragraph 24, wherein the first subset comprises all of the plurality of time-divided slots of the resource pool and a portion of the plurality of frequency-divided regions of the resource pool, the portion of the plurality of frequency-divided regions of the resource pool comprising the frequency-divided regions of the resource pool in which the one or more first previous signals were transmitted during the second resource pool instance.

Paragraph 26. A transmitting communications device according to Paragraph 24 or Paragraph 25, wherein the first subset comprises all of the plurality of frequency-divided regions of the resource pool and a portion of the plurality of time-divided slots of the resource pool, the portion of the plurality of time-divided slots of the resource pool comprising the time-divided slots of the resource pool in which the one or more first previous signals were transmitted during the second resource pool instance.

Paragraph 27. A transmitting communications device according to any of Paragraphs 24 to 26, wherein the time-divided slots and the frequency-divided regions of the first subset are a function of the time-divided slots and the frequency-divided regions of the resource pool in which the one or more first previous signals were transmitted during the second resource pool instance.

Paragraph 28. A transmitting communications device according to Paragraph 27, wherein the function is a frequency hopping function, wherein the time-divided slots of the first subset are the same as the time-divided slots in which the one or more first previous signals were transmitted, and wherein the frequency-divided regions of the first subset are the same as a number of the frequency-divided regions of the resource pool in which the one or more first previous signals were transmitted during the second resource pool instance and the frequency-divided regions of the first subset are shifted in frequency by one or more frequency-divided regions, with respect to the frequency-divided regions of the resource pool in which the one or more first previous signals were transmitted during the second resource pool instance, in accordance with the frequency hopping function.

Paragraph 29. A transmitting communications device according to Paragraph 27 or Paragraph 28, wherein the function is a time hopping function, wherein the frequency-divided regions of the first subset are the same as the frequency-divided regions in which the one or more first previous signals were transmitted, and wherein a number of the time-divided slots of the first subset is the same as a number of the time-divided slots of the resource pool in which the one or more first previous signals were transmitted during the second resource pool instance and the time-divided slots of the first subset are shifted in time by one or more time-divided slots, with respect to the time-divided slots of the resource pool in which the one or more first previous signals were transmitted during the second resource pool instance, in accordance with the time hopping function Paragraph 30. A transmitting communications device according to any of Paragraph 27 to 29, wherein the function is a first function and is different to a second function, wherein the second function is used by a second receiving communications device of the other communications devices to determine a portion of the first resource pool in which to monitor for signals transmitted by the second transmitting communications device.

Paragraph 31. A transmitting communications device according to any of Paragraphs 27 to 30, wherein the function is a first hopping function, the first hopping function being different to a second hopping function used by the second transmitting communications device to transmit signals to the receiving communications device.

Paragraph 32. A transmitting communications device according to any of Paragraphs 23 to 31, wherein the controller is configured in combination with the transmitter
to determine that the receiving communications device is monitoring the first subset for one or more signals from the second transmitting communications device, and
to transmit the one or more first current signals to the receiving communications devices in the first subset.

Paragraph 33. A transmitting communications device according to Paragraph 32, wherein the controller is configured in combination with the transmitter
to determine that the receiving communications device is monitoring the first subset for the one or more signals from the second transmitting communications device by detecting that the second transmitting communications device had transmitted the one or more first previous signals to the receiving communications device.

Paragraph 34. A transmitting communications device according to Paragraph 32 or Paragraph 33, wherein the controller is configured in combination with the transmitter
to determine that the receiving communications device is monitoring the first subset for the one or more signals from the second transmitting communications device by detecting control signalling exchanged between the receiving communications device and the second transmitting communications device, wherein the control signalling comprises an indication that the receiving communications device is monitoring the first subset for the one or more signals from the second transmitting communications device.

Paragraph 35. A transmitting communications device according to any of Paragraphs 32 to 34, wherein the controller is configured in combination with the transmitter
to determine, based on a predefined rule known by each of the transmitting communications device, the second transmitting communications device and the receiving communications device, that the second transmitting communications device will transmit one or more future signals in the same time-divided slots and/or frequency-divided regions of the resources pool as the one or more first previous signals.

Paragraph 36. A transmitting communications device according to Paragraph 35, wherein the controller is configured in combination with the transmitter
to transmit, dependent on the predefined rule, the one or more first current signals to the receiving communications devices in a portion of the time-divided slots and/or a portion of the frequency-divided regions of the first subset that does not overlap with a portion of the time-divided slots and/or a portion of the frequency-divided regions of the first subset in which the second transmitting communications device transmitted the one or more first previous signals to the receiving communications device.

Paragraph 37. A method of operating a transmitting communications device, the method comprising
transmitting signals to a receiving communications device of a plurality of other communications devices within sidelink communications resources of a plurality of instances of a resource pool of a sidelink interface, the resource pool being formed of a plurality of time-divided slots and a plurality of frequency-divided regions,
determining that the receiving communications device is only monitoring a first subset of the time-divided slots and the frequency-divided regions of the resource pool during a first of the resource pool instances, and
transmitting one or more first current signals to the receiving communications device in the first subset during the first resource pool instance,
wherein the first subset is dependent on which of the time-divided slots and the frequency-divided regions of the resource pool in which either the transmitting communications device or a second transmitting communications device of the other communications devices had transmitted one or more first previous signals to the receiving communications device during a second of the resource pool instances during which the receiving communications device had monitored a larger number of the time-divided slots of the resource pool than in the first subset and/or a larger number of the frequency-divided regions of the resource pool than in the first subset, wherein the second resource pool instance is a preceding resource pool instance to the first resource pool instance.

Paragraph 38. Circuitry for a transmitting communications device comprising
transmitter circuitry configured to transmit signals to a receiving communications device of a plurality of other communications devices within sidelink communications resources of a plurality of instances of a resource pool of a sidelink interface, the resource pool being formed of a plurality of time-divided slots and a plurality of frequency-divided regions, and controller circuitry configured in combination with the transmitter circuitry to determine that the receiving communications device is only monitoring a first subset of the time-divided slots and the frequency-divided regions of the resource pool during a first of the resource pool instances, and to transmit one or more first current signals to the receiving communications device in the first subset during the first resource pool instance, wherein the first subset is dependent on which of the time-divided slots and the frequency-divided regions of the resource pool in which either the transmitter circuitry or a second transmitting communications device of the other communications devices had transmitted one or more first previous signals to the receiving communications device during a second of the resource pool instances during which the receiving communications device had monitored a larger number of the time-divided slots of the resource pool than in the first subset and/or a larger number of the frequency-divided regions of the resource pool than in the first subset, wherein the second resource pool instance is a preceding resource pool instance to the first resource pool instance.

Paragraph 39. A receiving communications device comprising a receiver configured to receive signals from one or more of a plurality of other communications devices within sidelink communications resources of a plurality of instances of a resource pool of a sidelink interface, the resource pool being formed of a plurality of time-divided slots and a plurality of frequency-divided regions, and a controller configured in combination with the receiver to monitor for signals transmitted by one or more transmitting communications devices of the other communications devices to the receiving communications device in a subset of the time-divided slots and the frequency-divided regions of the resource pool during a first of the resource pool instances, to receive one or more signals in the subset during the first resource pool instance, and to monitor for signals in a larger number of the time-divided slots of the resource pool than in the subset and/or a larger number of the frequency-divided regions of the resource pool than in the subset during a second of the resource pool instances in response to receiving the one or more signals in the subset during the first resource pool instance.

Paragraph 40. A receiving communications device according to Paragraph 39, wherein the controller is configured in combination with the receiver to monitor for the signals in the subset during the first resource pool instance when the receiving communications device is operating in accordance with a reduced power mode of operation.

Paragraph 41. A receiving communications device according to Paragraph 39 or Paragraph 40, wherein the controller is configured in combination with the receiver to monitor for the signals in the larger number of the time-divided slots and/or the larger number of the frequency-divided regions for the duration of a timer, the timer being started upon reception of the one or more signals in the subset during the first resource pool instance, and, if the timer expires, to monitor for future signals in the subset during future resource pool instances after expiry of the timer.

Paragraph 42. A receiving communications device according to any of Paragraphs 39 to 41, wherein the subset is predetermined and known to each of the receiving communications device and the one or more transmitting communications devices.

Paragraph 43. A receiving communications device according to any of Paragraphs 39 to 42, wherein the subset is associated with a class of the receiving communications device.

Paragraph 44. A method of operating a receiving communications device, the method comprising receiving signals from one or more of a plurality of other communications devices within sidelink communications resources of a plurality of instances of a resource pool of a sidelink interface, the resource pool being formed of a plurality of time-divided slots and a plurality of frequency-divided regions, monitoring for signals transmitted by one or more transmitting communications devices of the other communications devices to the receiving communications device in a subset of the time-divided slots and the frequency-divided regions of the resource pool during a first of the resource pool instances, receiving one or more signals in the subset during the first resource pool instance, and monitoring for signals in a larger number of the time-divided slots of the resource pool than in the subset and/or a larger number of the frequency-divided regions of the resource pool than in the subset during a second of the resource pool instances in response to receiving the one or more signals in the subset during the first resource pool instance.

Paragraph 45. Circuitry for a receiving communications device comprising receiver circuitry configured to receive signals from one or more of a plurality of other communications devices within sidelink communications resources of a plurality of instances of a resource pool of a sidelink interface, the resource pool being formed of a plurality of time-divided slots and a plurality of frequency-divided regions, and controller circuitry configured in combination with the receiver circuitry to monitor for signals transmitted by one or more transmitting communications devices of the other communications devices to the receiver circuitry in a subset of the time-divided slots and the frequency-divided regions of the resource pool during a first of the resource pool instances, to receive one or more signals in the subset during the first resource pool instance, and to monitor for signals in a larger number of the time-divided slots of the resource pool than in the subset and/or a larger number of the frequency-divided regions of the resource pool than in the subset during a second of the resource pool instances in response to receiving the one or more signals in the subset during the first resource pool instance.

Paragraph 46. A transmitting communications device comprising a transmitter configured to transmit signals to a receiving communications device of a plurality of other communications devices within sidelink communications resources of a plurality of instances of a resource pool of a sidelink interface, the resource pool being formed of a plurality of time-divided slots and a plurality of frequency-divided regions, and a controller configured in combination with the transmitter to determine that the receiving communications device is only monitoring a subset of the time-divided slots and the frequency-divided regions of the resource pool during a first of the resource pool instances, to transmit one or more current signals to the receiving communications device in the subset during the first resource pool instance, and to determine, after transmission of the one or more current signals to the receiving communications device in the subset during the first resource pool instance, that the receiving communications device is monitoring for signals in a larger number of the time-divided slots of the resource pool than in the subset and/or a larger number of the frequency-divided regions of the resource pool than in the subset during a second of the resource pool instances in response to receiving the one or more current signals in the subset during the first resource pool instance.

Paragraph 47. A transmitting communications device according to Paragraph 46, wherein the subset is predetermined and known to each of the receiving communications device and the transmitting communications devices.

Paragraph 48. A transmitting communications device according to Paragraph 46 or Paragraph 47, wherein the subset is associated with a class of the receiving communications device.

Paragraph 49. A transmitting communications device according to any of Paragraphs 46 to 48, wherein the controller is configured in combination with the transmitter to transmit one or more next signals to the receiving communications device, during the second resource pool instance, in one or more of the time-divided slots of the resource pool that are outside of the subset and one or more of the frequency-divided regions of the resource pool that are outside of the subset.

Paragraph 50. A method of operating a transmitting communications device, the method comprising transmitting signals to a receiving communications device of a plurality of other communications devices within sidelink communications resources of a plurality of instances of a resource pool of a sidelink interface, the resource pool being formed of a plurality of time-divided slots and a plurality of frequency-divided regions, determining that the receiving communications device is only monitoring a subset of the time-divided slots and the frequency-divided regions of the resource pool during a first of the resource pool instances, transmitting one or more current signals to the receiving communications device in the subset during the first resource pool instance, and determining, after transmission of the one or more current signals to the receiving communications device in the subset during the first resource pool instance, that the receiving communications device is monitoring for signals in a larger number of the time-divided slots of the resource pool than in the subset and/or a larger number of the frequency-divided regions of the resource pool than in the subset during a second of the resource pool instances in response to receiving the one or more current signals in the subset during the first resource pool instance.

Paragraph 51. Circuitry for a transmitting communications device comprising transmitter circuitry configured to transmit signals to a receiving communications device of a plurality of other communications devices within sidelink communications resources of a plurality of instances of a resource pool of a sidelink interface, the resource pool being formed of a plurality of time-divided slots and a plurality of frequency-divided regions, and controller circuitry configured in combination with the transmitter circuitry to determine that the receiving communications device is only monitoring a subset of the time-divided slots and the frequency-divided regions of the resource pool during a first of the resource pool instances, to transmit one or more current signals to the receiving communications device in the subset during the first resource pool instance, and to determine, after transmission of the one or more current signals to the receiving communications device in the subset during the first resource pool instance, that the receiving communications device is monitoring for signals in a larger number of the time-divided slots of the resource pool than in the subset and/or a larger number of the frequency-divided regions of the resource pool than in the subset during a second of the resource pool instances in response to receiving the one or more current signals in the subset during the first resource pool instance.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognise that various features of the described embodiments may be combined in any manner suitable to implement the technique.

REFERENCES

[1] Holma H. and Toskala A, "LTE for UMTS OFDMA and SC-FDMA based radio access", John Wiley and Sons, 2009.
[2] RP-172834, "Revised WID on New Radio Access Technology," NTT DOCOMO, RAN #78.
[3] TR 38.840, "NR: Study on UE Power Saving (Release 16, v0.1.0)", 3GPP, November 2018.
[4] TS 36.300, "Evolved Universal Terrestrial Radio Access (E-UTRA) and Evolved Universal Terrestrial Radio Access Network (E-UTRAN); Overall description; Stage 2 (Release 16, v16.0.0)", 3GPP, January 2020.
[5] TS 38.321, "NR: Medium Access Control (MAC) Protocol Specification (Release 15, v15.4.0)", 3GPP, January 2019.

What is claimed is:

1. A receiving communications device comprising
a receiver configured to receive signals from one or more of a plurality of other communications devices within sidelink communications resources of a plurality of instances of a resource pool of a sidelink interface, the resource pool being formed of a plurality of time-divided slots and a plurality of frequency-divided regions, and
a controller configured in combination with the receiver to monitor for one or more first current signals transmitted by at least a first transmitting communications device of the other communications devices to the receiving communications device in a first subset of the time-divided slots and the frequency-divided regions of the resource pool during a first of the resource pool instances,
wherein the first subset is dependent on which of the time-divided slots and the frequency-divided regions of the resource pool in which one or more first previous signals were received by the receiving communications device from the first transmitting communications device during a second of the resource pool instances during which the receiving communications device is configured to monitor a larger number of the time-divided slots of the resource pool than in the first subset and/or a larger number of the frequency-divided regions of the resource pool than in the first subset, wherein the second resource pool instance is a preceding resource pool instance to the first resource pool instance.

2. A receiving communications device according to claim 1, wherein the time-divided slots and the frequency-divided regions of the first subset are the same as the time-divided slots and the frequency-divided regions of the resource pool in which the one or more first previous signals were received during the second resource pool instance.

3. A receiving communications device according to claim 1, wherein if the receiving communications device does not receive any of the one or more first current signals in the first subset during the first resource pool instance, the controller is configured in combination with the receiver
to monitor a larger number of the time-divided slots of the resource pool than in the first subset and/or a larger number of frequency-divided regions of the resource pool than in the first subset for one or more first next signals during a third of the resource pool instances, wherein the third resource pool instance is a subsequent resource pool instance to the first resource pool instance.

4. A receiving communications device according to claim 1, wherein the first subset comprises all of the plurality of time-divided slots of the resource pool and only the frequency-divided regions of the resource pool in which the one or more first previous signals were received during the second resource pool instance.

5. A receiving communications device according to claim 1, wherein the first subset comprises all of the plurality of frequency-divided regions of the resource pool and only the time-divided slots of the resource pool in which the one or more first previous signals were received during the second resource pool instance.

6. A receiving communications device according to claim 1, wherein the time-divided slots and the frequency-divided regions of the first subset are a function of the time-divided slots and the frequency-divided regions of the resource pool in which the one or more first previous signals were received during the second resource pool instance.

7. A receiving communications device according to claim 6, wherein the function is a frequency hopping function, wherein the time-divided slots of the first subset are the same as the time-divided slots in which the one or more first previous signals were received, and wherein the frequency-divided regions of the first subset are the same as a number of the frequency-divided regions of the resource pool in which the one or more first previous signals were received during the second resource pool instance and the frequency-divided regions of the first subset are shifted in frequency by one or more frequency-divided regions, with respect to the frequency-divided regions of the resource pool in which the one or more first previous signals were received during the second resource pool instance, in accordance with the frequency hopping function.

8. A receiving communications device according to claim 6, wherein the function is a time hopping function, wherein the frequency-divided regions of the first subset are the same as the frequency-divided regions in which the one or more first previous signals were received, and wherein a number of the time-divided slots of the first subset is the same as a number of the time-divided slots of the resource pool in which the one or more first previous signals were received during the second resource pool instance and the time-divided slots of the first subset are shifted in time by one or more time-divided slots, with respect to the time-divided slots of the resource pool in which the one or more first previous signals were received during the second resource pool instance, in accordance with the time hopping function.

9. A receiving communications device according to claim 6, wherein the function is a first function and is different to a second function, wherein the second function is used by a second receiving communications device of the other communications devices to determine a portion of the first resource pool in which to monitor for signals transmitted by a second transmitting communications device of the other communications devices.

10. A receiving communications device according to claim 1, wherein the controller circuitry is configured in combination with the receiver circuitry
to monitor for one or more second current signals transmitted by a second transmitting communications device of the other communications devices to the receiving communications device in a second subset of the time-divided slots and the frequency-divided regions of the resource pool during the first resource pool instance, the second subset being different to the first subset, wherein the time-divided slots and the frequency-divided regions of the first subset are a first function of the time-divided slots and the frequency-divided regions of the resource pool in which the one or more first previous signals were received during the second resource pool instance, and wherein the time-divided slots and the frequency-divided regions of the second subset are a second function of the time-divided slots and the frequency-divided regions of the resource pool in which one or more second previous signals were received by the receiving communications device from the second transmitting communications device during the second resource pool instance.

11. A receiving communications device according to claim 10, wherein the controller circuitry is configured in combination with the receiver circuitry to monitor for the one or more second current signals in the second subset in response to detecting that the one or more first previous signals collided with the one or more second previous signals in the second resource pool instance.

12. A receiving communications device according to claim 10, wherein the first function is a first hopping function and the second function is a second hopping function, the first hopping function being different to the second hopping function.

13. A receiving communications device according to claim 10, wherein if the receiving communications device does not receive any of the one or more first current signals in the first subset or second current signals in the second subset, the controller is configured in combination with the receiver
to monitor a larger number of the time-divided slots of the resource pool than in the first subset and a larger number of the frequency-divided regions of the resource pool than in the first subset for one or more first next signals and/or second next signals during of a third of the resource pool instances, wherein the third resource pool instance is a subsequent resource pool instance to the first resource pool instance.

14. A receiving communications device according to claim 1, wherein the controller circuitry is configured in combination with the receiver circuitry
to monitor for signals in the first subset for the duration of a timer, the timer being started upon reception of the one or more previous signals, and
to monitor for signals in a larger number of the time-divided slots of the resource pool than in the first subset and/or a larger number of the frequency-divided regions of the resource pool than in the first subset upon expiry of the timer.

15. A receiving communications device according to claim 14, wherein the timer is restarted upon reception of a signal in the first subset.

16. A receiving communications device according to claim 14, wherein the controller is configured in combination with the receiver, following the end of duration of the timer,
to operate in accordance with a short cycle of restricted monitoring, wherein the short cycle of restricted monitoring defines a pattern with which the receiving communications device should switch between monitoring the first subset during one or more resource pool instances and monitoring a larger number of the time-divided slots of the resource pool than in the first subset and/or a larger number of the frequency-divided regions of the resource pool than in the first subset during one or more other resource pool instances.

17. A receiving communications device according to claim 1, wherein the controller is configured in combination with the receiver
to monitor, during particular ones of the resource pool instances in accordance with a predefined pattern, a larger number of the time-divided slots of the resource pool than in the first subset and/or a larger number of the frequency-divided regions of the resource pool than in the first subset, wherein the second resource pool instance is one of the particular resource pool instances, and
to monitor, during the other resource pool instances to the particular resource pool instances, either the first subset or none of the time-divided slots and none of the frequency-divided regions of the resource pool.

18. A receiving communications device according to claim 1, wherein the controller is configured in combination with the receiver
to monitor for the one or more first current signals in each of a plurality of subsets of the time-divided slots and the frequency-divided regions of the resource pool during the first resource pool instance, wherein the first subset is one of the plurality of subsets.

19. A method of operating a receiving communications device, the method comprising
receiving signals from one or more of a plurality of other communications devices within sidelink communications resources of a plurality of instances of a resource pool of a sidelink interface, the resource pool being formed of a plurality of time-divided slots and a plurality of frequency-divided regions, and
monitoring for one or more first current signals transmitted by at least a first transmitting communications device of the other communications devices to the receiving communications device in a first subset of the time-divided slots and the frequency-divided regions of the resource pool during a first of the resource pool instances,
wherein the first subset is dependent on which of the time-divided slots and the frequency-divided regions of the resource pool in which one or more first previous signals were received by the receiving communications device from the first transmitting communications device during a second of the resource pool instances during which the receiving communications device is configured to monitor a larger number of the time-divided slots of the resource pool than in the first subset and/or a larger number of the frequency-divided regions of the resource pool than in the first subset, wherein the second resource pool instance is a preceding resource pool instance to the first resource pool instance.

20. A method of operating a transmitting communications device, the method comprising
transmitting signals to a receiving communications device of a plurality of other communications devices within sidelink communications resources of a plurality of instances of a resource pool of a sidelink interface, the resource pool being formed of a plurality of time-divided slots and a plurality of frequency-divided regions,
determining that the receiving communications device is only monitoring a first subset of the time-divided slots and the frequency-divided regions of the resource pool during a first of the resource pool instances, and transmitting one or more first current signals to the receiving communications device in the first subset during the first resource pool instance,
wherein the first subset is dependent on which of the time-divided slots and the frequency-divided regions of the resource pool in which either the transmitting communications device or a second transmitting communications device of the other communications devices had transmitted one or more first previous signals to the receiving communications device during a second of the resource pool instances during which the receiving communications device had monitored a larger number of the time-divided slots of the resource pool than in the first subset and/or a larger number of the frequency-divided regions of the resource pool than in the first subset, wherein the second resource pool instance is a preceding resource pool instance to the first resource pool instance.

* * * * *